USO11457113B2

(12) United States Patent
Tomii

(10) Patent No.: US 11,457,113 B2
(45) Date of Patent: Sep. 27, 2022

(54) IMAGE PROCESSING APPARATUS CONFIGURED TO INSTRUCT EXECUTION OF CALIBRATION USING TEST CHART, AND IMAGE FORMING APPARATUS CONFIGURED TO EXECUTE CALIBRATION USING TEST CHART

(71) Applicant: CANON KABUSHIKI KAISHA, Tokyo (JP)

(72) Inventor: Hiroshi Tomii, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/116,317

(22) Filed: Dec. 9, 2020

(65) Prior Publication Data
US 2021/0185181 A1    Jun. 17, 2021

(30) Foreign Application Priority Data
Dec. 11, 2019    (JP) .............................. JP2019-223473

(51) Int. Cl.
*H04N 1/00*    (2006.01)
*G06F 3/12*    (2006.01)

(52) U.S. Cl.
CPC ....... *H04N 1/00087* (2013.01); *G06F 3/1208* (2013.01); *G06F 3/1229* (2013.01); *H04N 1/00045* (2013.01)

(58) Field of Classification Search
CPC ........... H04N 1/00045; H04N 1/00087; H04N 1/4078; H04N 1/6055; H04N 2201/0005; G06F 3/1229; G06F 3/1208

USPC .......................................... 358/1.9, 504, 406
See application file for complete search history.

(56) References Cited

U.S. PATENT DOCUMENTS

| 10,248,065 | B1 | 4/2019 | Saito et al. |
| 10,498,929 | B2 | 12/2019 | Tomii |
| 2014/0313529 | A1* | 10/2014 | Nakashio ............. G06K 15/027 |
| | | | 358/1.9 |
| 2017/0054878 | A1* | 2/2017 | Takemura ............ H04N 1/6008 |
| 2019/0101857 | A1* | 4/2019 | Saito .................. G03G 15/5062 |

* cited by examiner

*Primary Examiner* — Kent Yip
(74) *Attorney, Agent, or Firm* — Canon U.S.A., Inc., IP Division

(57) ABSTRACT

An information processing apparatus is configured to communicate with an image forming apparatus. The image forming apparatus includes a document feeder configured to convey, in order to read an original on an original tray, the original on the tray. The image forming apparatus is configured to form an image on a sheet based on a result of reading the original. The information processing apparatus includes an acquisition unit configured to acquire user instruction information about types of calibration selected from among a plurality of types of calibration for adjusting a quality of an image to be formed by the image forming apparatus; and a controller configured to determine test charts to be created by the image forming apparatus based on the user instruction information; receive an execution instruction that instructs to create the test charts in succession.

13 Claims, 23 Drawing Sheets

| | SELECT ADJUSTMENT ITEM AND SHEET TYPE | | |
|---|---|---|---|
| ADJUSTMENT ITEM | PLAIN PAPER | CARDBOARD | RECYCLED PAPER |
| IN-PLANE DENSITY UNEVENNESS CORRECTION | ○ | — | — |
| TONE CORRECTION: PRINTING | ○ | ○ | ○ |
| TONE CORRECTION: COPYING | ○ | — | — |
| PRINTING POSITION ADJUSTMENT | — | — | — |
| POINT IMAGE/STREAKED IMAGE DIAGNOSIS | — | — | — |

EXECUTE COLLECTIVE ADJUSTMENT

|  | MEASUREMENT VALUE | IDEAL VALUE | POSITION DEVIATION AMOUNT |
|---|---|---|---|
| LEAD POSITION (FRONT SIDE) | (c+e)/2 | 1cm | MEASUREMENT VALUE − IDEAL VALUE |
| SIDE POSITION (FRONT SIDE) | (f+j)/2 | 1cm | MEASUREMENT VALUE − IDEAL VALUE |
| MAIN SCANNING MAGNIFICATION (FRONT SIDE) | ((b−d−f)+(b−h−j))/2 | MAIN SCANNING DIRECTION SHEET LENGTH − 2cm | (MEASUREMENT VALUE − IDEAL VALUE) /IDEAL VALUE |
| SUB-SCANNING MAGNIFICATION (FRONT SIDE) | ((a−c−g)−(a−e−i))/2 | SUB-SCANNING DIRECTION SHEET LENGTH − 2cm | (MEASUREMENT VALUE − IDEAL VALUE) /IDEAL VALUE |
| LEAD POSITION (BACK SIDE) | (k+m)/2 | 1cm | MEASUREMENT VALUE − IDEAL VALUE |
| SIDE POSITION (BACK SIDE) | (n+r)/2 | 1cm | MEASUREMENT VALUE − IDEAL VALUE |
| MAIN SCANNING MAGNIFICATION (BACK SIDE) | ((b−l−n)+(b−p−r))/2 | MAIN SCANNING DIRECTION SHEET LENGTH − 2cm | (MEASUREMENT VALUE − IDEAL VALUE) /IDEAL VALUE |
| SUB-SCANNING MAGNIFICATION (BACK SIDE) | ((a−k−o)+(a−m−q))/2 | SUB-SCANNING DIRECTION SHEET LENGTH − 2cm | (MEASUREMENT VALUE − IDEAL VALUE) /IDEAL VALUE |

FIG. 10

| PRESENCE/ABSENCE OF STREAK DETECTED BEFORE TEST CHART IS CONVEYED TO READING POSITION | PRESENCE/ABSENCE OF STREAK DETECTED IN BLANK PORTION | CAUSE OF STREAK |
|---|---|---|
| PRESENT | PRESENT | READER |
| ABSENT | PRESENT | PRINTER |

FIG. 19A

| ADJUSTMENT ITEM SELECTION | ADJUSTMENT ITEM |
|---|---|
| ○ | IN-PLANE DENSITY UNEVENNESS CORRECTION |
| ○ | TONE CORRECTION: PRINTING |
| ▲ | TONE CORRECTION: COPYING |
| — | PRINTING POSITION ADJUSTMENT |
| — | TRANSFER OUTPUT ADJUSTMENT |
| — | POINT IMAGE/STREAKED IMAGE DIAGNOSIS |
| — | DOUBLE-SIDE READING COLOR CORRECTION |
| ○ | COLOR MISREGISTRATION ADJUSTMENT |

TYPE OF SHEET TO BE ADJUSTED
PLAIN PAPER

EXECUTE COLLECTIVE ADJUSTMENT

FIG. 19B

| ADJUSTMENT ITEM SELECTION | ADJUSTMENT ITEM |
|---|---|
| ○ | IN-PLANE DENSITY UNEVENNESS CORRECTION |
| ○ | TONE CORRECTION: PRINTING *SHEET IS USED |
| — | TONE CORRECTION: PRINTING *SHEET IS NOT USED |
| — | TONE CORRECTION: COPYING *SHEET IS USED |
| ○ | TONE CORRECTION: COPYING *SHEET IS NOT USED |
| — | PRINTING POSITION ADJUSTMENT |
| — | TRANSFER OUTPUT ADJUSTMENT |
| — | POINT IMAGE/STREAKED IMAGE DIAGNOSIS |
| — | DOUBLE-SIDE READING COLOR CORRECTION |
| ○ | COLOR MISREGISTRATION ADJUSTMENT |

TYPE OF SHEET TO BE ADJUSTED
PLAIN PAPER

EXECUTE COLLECTIVE ADJUSTMENT

| ADJUSTMENT ITEM | ADJUSTMENT ITEM SELECTION | | | | | |
|---|---|---|---|---|---|---|
| | Case_A | Case_B | Case_C | Case_D | Case_E | Case_F |
| IN-PLANE DENSITY UNEVENNESS CORRECTION | ○ | ○ | ○ | ○ | ○ | — |
| TONE CORRECTION: PRINTING | ○ | ○ | — | ○ | ○ | — |
| TONE CORRECTION: COPYING | ○ | ○ | ○ | — | ○ | — |
| PRINTING POSITION ADJUSTMENT | ○ | — | — | — | ○ | — |
| TRANSFER OUTPUT ADJUSTMENT | ○ | — | — | — | ○ | — |
| POINT IMAGE/STREAKED IMAGE DIAGNOSIS | ○ | — | — | — | — | ○ |
| DOUBLE-SIDE READING COLOR CORRECTION | ○ | — | — | — | — | ○ |

FIG. 21

| RECOMMENDED ADJUSTMENT | ADJUSTMENT ITEM SELECTION | ADJUSTMENT ITEM |
|---|---|---|
| — | — | IN-PLANE DENSITY UNEVENNESS CORRECTION |
| — | — | AUTOMATIC TONE CORRECTION: PRINTING |
| — | — | AUTOMATIC CORRECTION: COPYING |
| — | — | REGISTRATION ADJUSTMENT |
| ◆ | ○ | ALIGNMENT ADJUSTMENT |
| ◆ | — | TRANSFER OUTPUT ADJUSTMENT |
| — | — | POINT IMAGE/STREAKED IMAGE DIAGNOSIS |

| REASON FOR SELECTING RECOMMENDED ADJUSTMENT ITEM | BECAUSE NEW TYPE OF SHEET IS USED |
|---|---|

EXECUTE COLLECTIVE ADJUSTMENT

FIG. 22

| ADJUSTMENT ITEM | SELECT ADJUSTMENT ITEM AND SHEET TYPE | | |
| --- | --- | --- | --- |
| | PLAIN PAPER | CARDBOARD | RECYCLED PAPER |
| IN-PLANE DENSITY UNEVENNESS CORRECTION | ○ | — | — |
| TONE CORRECTION: PRINTING | ○ | ○ | ○ |
| TONE CORRECTION: COPYING | ○ | — | — |
| PRINTING POSITION ADJUSTMENT | — | — | — |
| POINT IMAGE/STREAKED IMAGE DIAGNOSIS | — | — | — |

EXECUTE COLLECTIVE ADJUSTMENT

FIG. 23

IMAGE PROCESSING APPARATUS CONFIGURED TO INSTRUCT EXECUTION OF CALIBRATION USING TEST CHART, AND IMAGE FORMING APPARATUS CONFIGURED TO EXECUTE CALIBRATION USING TEST CHART

BACKGROUND

Field

The present disclosure relates to a calibration function of adjusting a quality of an image formed by an image forming apparatus.

Description of the Related Art

An electrophotographic image forming apparatus has a calibration function, with which a test chart is created to perform image quality adjustment, diagnosis of an image failure, and the like based on a result of reading the test chart by a reading device. Examples of the image quality adjustment include tone correction, in-plane density unevenness correction, printing position adjustment, and transfer output adjustment (secondary transfer voltage adjustment). Examples of the image failure include generation of a point image or a streaked image. The test chart is formed by printing a test image corresponding to contents of adjustment or contents of diagnosis on a sheet.

The tone correction is described as an example of the image quality adjustment with the use of the test chart. Tone characteristics (density characteristics) of an image formed on the sheet by the image forming apparatus fluctuate due to a variation of a variety of factors. For example, the tone characteristics fluctuate due to a change of an environment condition such as an air temperature and humidity at an installed place of the image forming apparatus, and due to a temporal change of a component of the image forming apparatus. Therefore, the image forming apparatus executes the tone correction for maintaining the tone characteristics of the image to be formed at ideal tone characteristics. In the tone correction, first, a test image is formed on the sheet, and a test chart for the tone correction is created. The image forming apparatus reads the test chart with the reading device, to thereby acquire an image density of the test image. The image forming apparatus creates a correction table for enabling the acquired image density to become a target density. At the time of image formation, the tone correction is carried out with the use of this correction table. The correction table is prepared for each sheet type (a basis weight, as to whether the sheet is coated, and as to whether the sheet is recycled paper).

In U.S. Ser. No. 10/498,929 (B2), there is proposed a method for reducing a user's workload in calibration by creating a plurality of test charts in succession and reading the plurality of test charts in succession with the use of an automatic original conveying device. In U.S. Ser. No. 10/248,065 (B1), there is proposed a method of executing transfer output adjustment and printing position adjustment, which are required to be performed for each sheet type separately, for sheets of the same type at once.

In U.S. Ser. No. 10/498,929 (B2), tone correction for screens having a plurality of types of resolutions (numbers of lines) can be executed at once. However, no disclosure about collective execution of a plurality of types of adjustment is found in U.S. Ser. No. 10/498,929 (B2). In U.S. Ser. No. 10/248,065 (B1), a plurality of types of adjustment can be executed at once. However, unrequired adjustment may be executed in a collective adjustment mode, depending on a state of the image forming apparatus or a user's purpose. For instance, tone correction, in-plane density unevenness correction, and printing position adjustment are all executed in the collective adjustment mode even in a case in which tone correction and in-plane density unevenness correction are to be executed but printing position adjustment is not required. The execution of unrequired adjustment causes a waste of adjustment time and an increase of wasted test charts.

SUMMARY

According to an aspect of the present disclosure, an information processing apparatus configured to communicate with an image forming apparatus, the image forming apparatus including a document feeder configured to convey, in order to read an original on an original tray, the original on the tray, the image forming apparatus being configured to form an image on a sheet based on a result of reading the original, the information processing apparatus includes: an acquisition unit configured to acquire user instruction information about types of calibration selected from among a plurality of types of calibration for adjusting a quality of an image to be formed by the image forming apparatus; and a controller configured to: determine test charts to be created by the image forming apparatus based on the user instruction information; receive an execution instruction that instructs to create the test charts in succession; and control, in a case where the execution instruction is received, the image forming apparatus to create the test charts in succession, wherein the image forming apparatus is configured to control the document feeder to convey the test charts, and wherein the image forming apparatus is configured to control adjustment factors for adjusting the quality of the image to be formed, based on results of reading the test charts.

The present information discloses an image forming apparatus that allows selection of adjustment types even in an operation mode in which a plurality of types of adjustment are executed at once. Further features of the present disclosure will become apparent from the following description of exemplary embodiments (with reference to the attached drawings).

BRIEF DESCRIPTION OF THE DRAWINGS

FIG. 10 is an explanatory table of a method of detecting an amount of deviation in geometric characteristics.

FIG. 19A and FIG. 19B are exemplary illustrations of an execution reception operation screen in a third embodiment of the present disclosure.

FIG. 21 is an explanatory table of an example of changing adjustment items selected in advance.

FIG. 22 is an exemplary illustration of an execution reception operation screen in a fourth embodiment of the present disclosure.

FIG. 23 is an exemplary illustration of an execution reception operation screen in a fifth embodiment of the present disclosure.

DESCRIPTION OF THE EMBODIMENTS

Now, embodiments of the present disclosure are described with reference to the accompanying drawings.

First Embodiment

Figure 1:
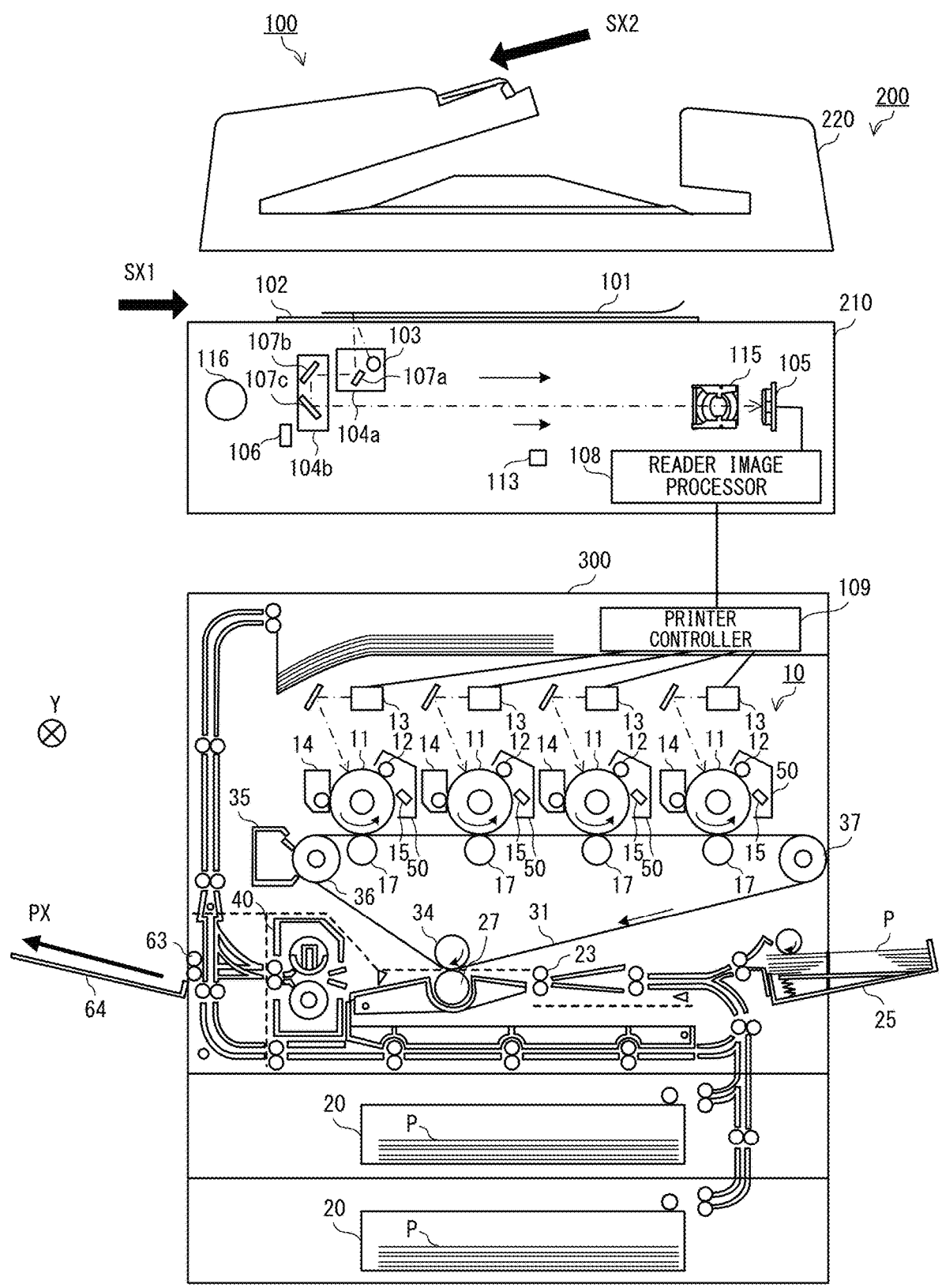
FIG. 1 is a configuration diagram of an image forming apparatus.

FIG. 1 is a configuration diagram of an image forming apparatus of a first embodiment of the present disclosure. An image forming apparatus 100 includes: a reading device (reader 200) configured to read an image from an original; and a printer 300 configured to form the image on a sheet P. The reader 200 includes a document scanner 210 and an automatic document feeder (ADF) 220. The document scanner 210 is provided on the printer 300, and the ADF 220 is provided on the document scanner 210. The reader 200 reads an image printed on an original 101, and transmits image data, which represents the read image, to the printer 300. The printer 300 can perform printing processing (image formation processing) for the sheet P based on the image data acquired from the reader 200.

In FIG. 1, a direction of conveyance of the sheet by the printer 300 is defined as a PX-direction, and a direction perpendicular to the PX-direction is defined as a Y-direction. Moreover, a direction of paper feeding by the ADF 220 is defined as an SX2-direction, and a moving direction of a first mirror unit 104a and a second mirror unit 104b included in the document scanner 210 is defined as an SX1-direction.

The reader 200 is configured to read an image of an original fed by the ADF 220. The reader 200 is also capable of reading an image of the original 101 placed on a platen 102, which is provided on a side of the document scanner 210 that faces the ADF 220. The document scanner 210 includes therein an image sensor 105 and a reader image processor 108. The reader image processor 108 is configured to convert an electric signal that is generated by the image sensor 105 by reading the original 101 into image data, and transmit the image data to the printer 300.

The printer 300 includes therein a printer controller 109. The printer controller 109 acquires the image data from the reader image processor 108 of the document scanner 210. The printer controller 109 controls processing of forming the image on the sheet P based on the acquired image data. The printer 300 includes an image forming unit 10, which is an electrophotographic image forming engine configured to generate an image based on image data. The image forming unit 10 includes four units in order to generate an image in a yellow (Y) color, an image in a magenta (M) color, an image in a cyan (C) color, and an image in a black (K) color. The printer 300 includes an intermediate transfer belt 31 and a fixing device 40. The printer 300 is also applicable to monochromatic printing by using the black unit alone.

As illustrated in FIG. 1, the image forming unit 10 includes four photosensitive drums 11, which correspond to the yellow color, the magenta color, the cyan color, and the black color from the left in the stated order. A roller-shaped charging device 12, an exposure device 13, a developing device 14, a primary transfer device 17, a drum cleaner 15, and others are arranged around each of the photosensitive drums 11. Steps of forming a toner image in black as a representative of the four colors are described below. The same steps apply to the forming of toner images in other colors.

In a case where image forming is started, the relevant photosensitive drum 11 rotates in the direction of the arrow. The charging device 12 evenly charges a surface of the photosensitive drum 11. The exposure device 13 exposes the surface of the photosensitive drum 11 to laser light modulated in accordance with image data that is acquired from the printer controller 109 to form an electrostatic latent image. The developing device 14 develops the electrostatic latent image with a toner adhered thereto, to form a toner image. The primary transfer device 17 performs primary transfer in which the toner image formed on the photosensitive drum 11 is transferred onto the intermediate transfer belt 31. The drum cleaner 15 removes the toner remaining on the photosensitive drum 11 after the primary transfer. This brings the photosensitive drum 11 to a state ready for the forming of the next image. The drum cleaner 15 in the first embodiment is configured so that a cleaning blade made of an elastic material is in contact with the surface of the photosensitive drum 1.

The exposure device 13 scans the surface of the photosensitive drum 11 with the laser light in the Y-direction. The Y-direction is accordingly a main scanning direction in a case where the printer 300 forms an image. A main scanning direction of the reader 200 is the Y-direction, which is the same as the main scanning direction of the printer 300.

The intermediate transfer belt 31 is suspended around three rollers, namely, rollers 34, 36, and 37, and is rotated clockwise in FIG. 1. The intermediate transfer belt 31 is an image bearing member configured to bear toner images transferred from the photosensitive drums 11, and convey the toner images toward the roller 34 by rotation. Toner images of the four colors are transferred onto the intermediate transfer belt 31 from the photosensitive drums 11 of the four colors in a superimposed manner, to thereby form a full-color toner image. The roller 34 forms a secondary transfer portion together with a secondary transfer device 27, which is placed across the intermediate transfer belt 31 from the roller 34. A transfer cleaner 35 is provided across the intermediate transfer belt 31 from the roller 36.

A sheet P is fed from a sheet feeding cassette 20 or a manual feed tray 25. When fed from the sheet feeding cassette 20 or the manual feed tray 25, the sheet P is conveyed on a conveying path to a registration roller pair 23. The registration roller pair 23 temporarily stops the conveyed sheet P to correct skew feeding of the sheet P with respect to the conveying direction. The registration roller pair 23 sends the sheet P to the secondary transfer portion in time with the conveyance of the toner image born on the intermediate transfer belt 31 to the secondary transfer portion. The secondary transfer device 27 transfers the toner image on the intermediate transfer belt 31 to the sheet P (secondary transfer). The transfer cleaner 35 removes the toners remaining on the intermediate transfer belt 31. This brings the intermediate transfer belt 31 to a state ready for the forming of the next image.

The sheet P having the toner image transferred thereto is conveyed to the fixing device 40 by the secondary transfer device 27. The fixing device 40 fixes the toner image to the sheet P. For example, the fixing device 40 heats and melts the toner image and applies pressure thereto to fix the toner image to the sheet P. An image is thus formed on the sheet P. The sheet P having the image formed thereon is discharged to a discharge tray 64 by discharge rollers 63.

Document Scanner

Figure 2A:
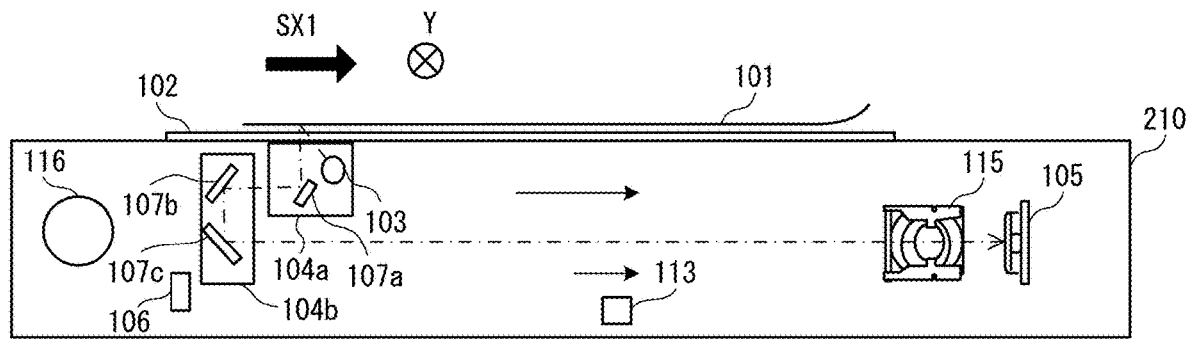
FIG. 2A and FIG. 2B are explanatory diagrams of a document scanner.
Figure 2B:
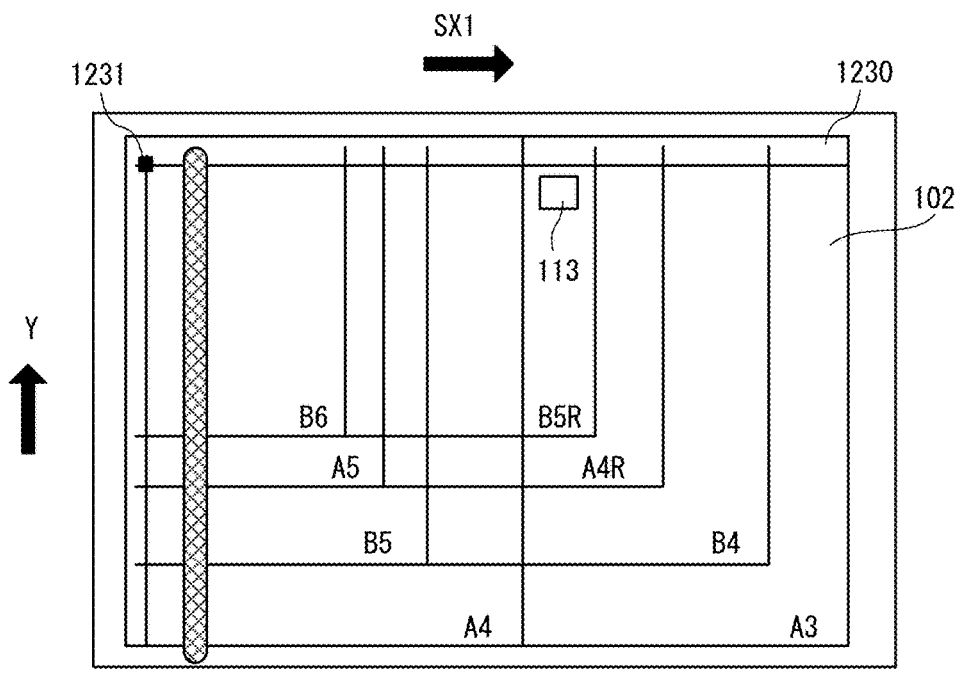

FIG. 2A and FIG. 2B are explanatory diagrams of the document scanner 210. In FIG. 2A, a configuration of the document scanner 210 is illustrated. FIG. 2B is a diagram of the document scanner 210 when viewed from the ADF 220. In a housing of the document scanner 210, the document scanner 210 includes the first mirror unit 104a, the second mirror unit 104b, an image sensor 105, a lens 115, a motor 116, an original size detection sensor 113, and a home position sensor 106. The first mirror unit 104a includes an original lighting lamp 103 and a first mirror 107a. The second mirror unit 104b includes a second mirror 107b and a third mirror 107c. The first mirror unit 104a and the second mirror unit 104b are movable in the SX1-direction by being driven by the motor 116.

The document scanner 210 can perform image reading in accordance with a first reading mode of reading the original 101 to be conveyed by the ADF 220 and a second reading mode of reading the original 101 placed on the platen 102. The first reading mode is sometimes called "flow reading" and "ADF reading." The second reading mode is sometimes called "fixed reading" and "original table reading."

The first reading mode includes two types of reading systems which are a sheet-through system and an original fixing system.

In the sheet-through system, through the rotation of the motor 116, the first mirror unit 104a and the second mirror unit 104b move to a flow reading position and stop. The flow reading position is a reading position at the time of reading the image from the original 101 that is being conveyed by the ADF 220. The image sensor 105 reads the image of the original 101 during a period in which the ADF 220 is conveying the original 101 on the platen 102. The first mirror unit 104a and the second mirror unit 104b remain halted at the reading position during the reading of the image.

The document scanner 210 turns on the original lighting lamp 103, and applies light to a reading surface (surface on which an image is printed) of the original 101. The first mirror 107a, the second mirror 107b, and the third mirror 107c deflect reflected light (image light) of the light applied to the original 101 and guide the polarized light to the lens 115. The lens 115 forms an image from the image light onto a light receiving surface of the image sensor 105. The image sensor 105 converts the image light into an electrical signal. The reader image processor 108 acquires the electrical signal from the image sensor 105, and generates image data. At the time of reading the image, the first mirror unit 104a, the second mirror unit 104b, the image sensor 105, and the reader image processor 108 operate as described above. Those operations at the time of reading are the same regardless of the reading modes and the reading systems.

In the original fixing system, the ADF 220 conveys the original 101 onto the platen 102, and stops the original 101 at a predetermined position on the platen 102. The first mirror unit 104a and the second mirror unit 104b read the image of the original 101 while moving in the SX1-direction by the motor 116. After reading the image, the ADF 220 resumes the conveyance of the original 101 and discharges the original 101.

At the time of the second reading mode, through the rotation of the motor 116, the first mirror unit 104a and the second mirror unit 104b move temporarily to a home position, at which the home position sensor 106 is present. On the platen 102, one original is placed with a reading surface thereof directed to the platen 102, and is positionally fixed by the ADF 220 to be placed. The document scanner 210 turns on the original lighting lamp 103, and applies light to the reading surface of the original 101. While moving in the SX1-direction, the first mirror unit 104a and the second mirror unit 104b deflect the image light from the original 101 by the first mirror 107a, the second mirror 107b, and the third mirror 107c, and guide the image light to the lens 115. The lens 115 forms an image from the image light onto the light receiving surface of the image sensor 105. The image sensor 105 converts the image light into an electrical signal. The reader image processor 108 acquires the electrical signal from the image sensor 105, and generates image data.

The document scanner 210 can detect the size (original size) of the original 101. The document scanner 210 in the first embodiment detects the original size before reading such an original image. First, the document scanner 210 irradiates an end portion of the original 101 by the original lighting lamp 103, and reads the reflected light from the original 101 by the image sensor 105. The image sensor 105 is a line sensor in which, for example, a plurality of photoelectric conversion elements are arrayed in the Y-direction. The image sensor 105 reads a predetermined number of lines. A direction of the lines is perpendicular to the SX1-direction. A width (length in the Y-direction) of the original 101 is acquired based on a result (electrical signal) of reading the predetermined number of lines by the image sensor 105. The Y-direction is a main scanning direction in a case where the reader 200 reads an image because the image sensor 105 is configured so that a plurality of photoelectric conversion elements are arrayed in the Y-direction. The SX1 direction is a sub-scanning direction orthogonal to the main scanning direction when the reader 200 reads an image.

Moreover, the length (length in the SX1-direction) of the original 101 is detected based on a detection result of the original size detection sensor 113. At least one original size detection sensor 113 is disposed at a predetermined position in the SX1-direction in the housing of the document scanner 210, and detects whether or not the original 101 on the platen 102 is present at the predetermined position. The original size detection sensor 113 is, for example, an infrared sensor, and is capable of outputting as to whether or not the original 101 is present in a binary manner. From a detection result of the original size detection sensor 113, it can be determined whether or not the original 101 exceeds the position of the original size detection sensor 113 in terms of length. In a case where the length of the original 101 is desired to be detected accurately, a plurality of original size detection sensors 113 are disposed.

On the basis of the width and length of the original 101, which are detected as described above, it is determined to which of a plurality of predetermined fixed sizes the size of the original 101 corresponds. Moreover, on the basis of the width and length of the original 101, it is also determined in which orientation (longitudinal reading or lateral reading) the original 101 is placed on the platen 102.

As illustrated in FIG. 2B, the platen 102 has an original size label 1230 disposed on an outer periphery thereof, and is provided with an original registration mark 1231 at a reference abutment portion on a back side in the Y-direction. The original 101 is placed so that a vertex thereof is allowed to abut against the original registration mark 1231. The original registration mark 1231 serves as a reference of originals having the fixed sizes. The original size detection sensor 113 in the first embodiment is disposed on the back side in the Y-direction of the platen 102 at a position a little more distant than a length of an original having the A4 size from the original registration mark 1231. Therefore, the original size detection sensor 113 cannot detect originals 101 having the A4, B5, A5 and B6 sizes, and can detect originals 101 having the A3, B4, A4R and B5R sizes.

ADF

Figure 3A:
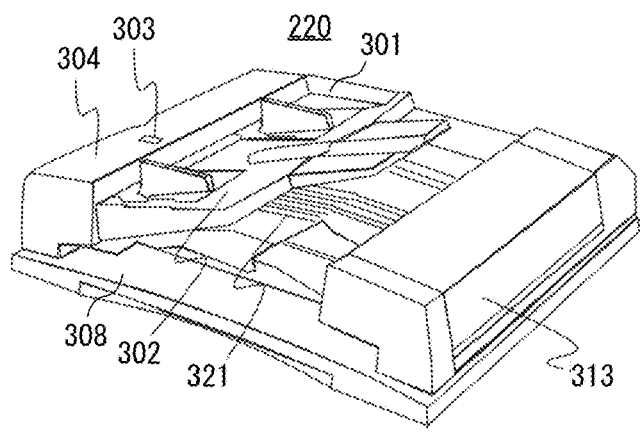
FIG. 3A, FIG. 3B, FIG. 3C, and FIG. 3D are explanatory diagrams of an ADF.
Figure 3B:
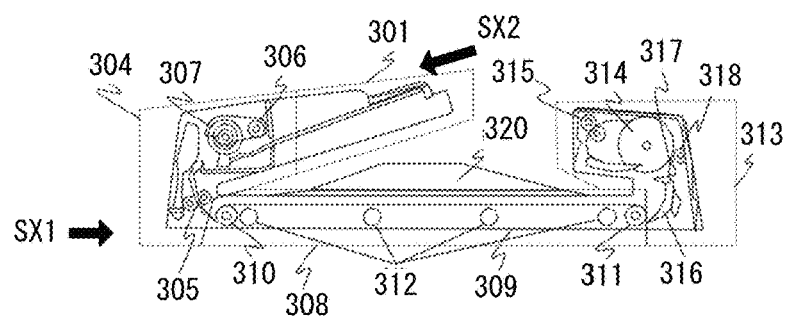
Figure 3C:
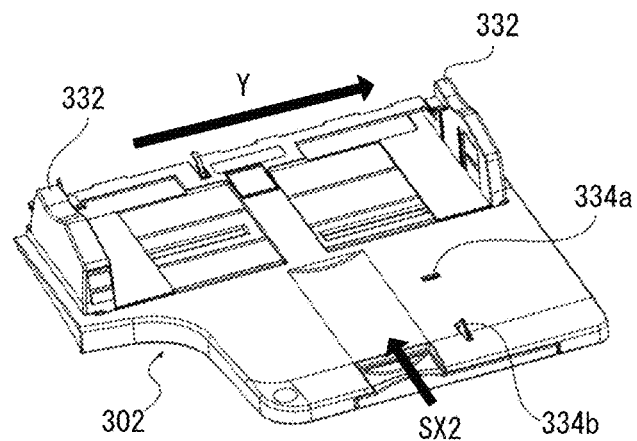
Figure 3D:
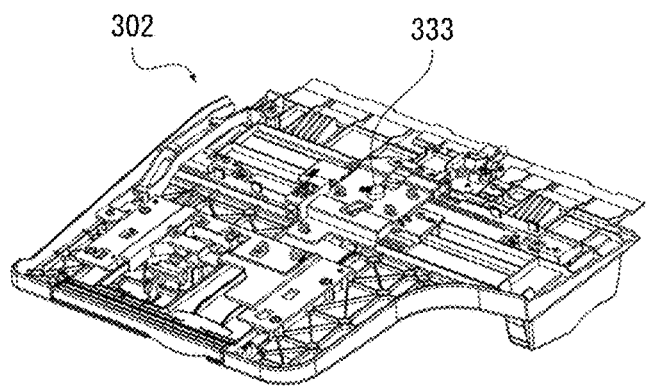

FIG. 3A to FIG. 3D are explanatory diagrams of the ADF 220. FIG. 3A is an exterior appearance perspective view of the ADF 220. FIG. 3B is an internal configuration diagram of the ADF 220. FIG. 3C is a view of an original stacker 301 to be described later when viewed from obliquely above. FIG. 3D is an internal configuration diagram of the original stacker 301 to be described later. The ADF 220 includes the original stacker 301, an original feeder 304, an original conveyor 308, and a reverse discharge portion 313.

The original stacker 301 includes an original tray 302. On the original tray 302, one or more originals 101 can be stacked on a stacking surface thereof. The original tray 302 functions as a feeder. The original stacker 301 is provided with an original indicator 303 configured to turn on in a case where the originals 101 are stacked on the original tray 302. The originals 101 stacked on the original tray 302 are conveyed one by one onto the platen 102 by the original feeder 304, pass on the platen 102, and are discharged to a discharge tray 321 of the reverse discharge portion 313 by the reverse discharge portion 313.

In the original feeder 304, a pickup roller 306, a feed roller 307, and a registration roller pair 305 are provided along a conveying path of the originals 101. The pickup roller 306 is a roller that is rotatable and vertically movable. At the time of feeding the originals 101, the pickup roller 306 is lowered on an uppermost original 101 of an original bundle stacked on the original tray 302 to be brought into contact with this original 101, and conveys this original 101.

The feed roller 307 conveys such originals 101, which are conveyed by the pickup roller 306, to the registration roller pair 305. The originals 101 are fed one by one by the pickup roller 30 and the feed roller 307. The registration roller pair 305 is stopped at the time when a tip end of each original 101 reaches the registration roller pair 305. This is in order to correct skew feeding of the original 101. The registration roller pair 305 starts to rotate after correcting the skew feeding, and conveys the original 101 to the original conveyor 308.

The original conveyor 308 includes a conveyor belt 309, a drive roller 310, a driven roller 311, and a plurality of pressing rollers 312. The original conveyor 308 conveys the original 101 in the SX1-direction with the use of the conveyor belt 309. The conveyor belt 309 is tensioned around the drive roller 310 and the driven roller 311. Moreover, the conveyor belt 309 is pressed against the platen 102 by the pressing rollers 312. By frictional force, the conveyor belt 309 conveys the original 101 that enters between the conveyor belt 309 and the platen 102. Thus, the original 101 is conveyed on the platen 102.

In the original fixing system of the first reading mode, the conveyor belt 309 stops in a case where the original 101 reaches the reading position. After the original 101 is read by the first mirror unit 104a and the second mirror unit 104b, the conveyor belt 309 conveys the original 101 to the reverse discharge portion 313. In this case, the first mirror unit 104a and the second mirror unit 104b read the stopped original 101 while moving in the SX1-direction.

In the sheet-through system of the first reading mode, the conveyor belt 309 does not stop even when the original 101 reaches the reading position, and continues to convey the original 101. In this case, while continuing to stop, the first mirror unit 104a and the second mirror unit 104b read the original 101 that is being conveyed. That is, scanning of the original 101 is performed by the movement of the original 101 in place of the first mirror unit 104a and the second mirror unit 104b.

The reverse discharge portion 313 includes a reverse roller 314, a conveyor roller pair 315, a reverse flapper 316, a discharge flapper 317, and a reverse roller 318. The reverse discharge portion 313 reverses the front and back of the original 101 conveyed from the original conveyor 308, and discharges the original 101 to the discharge tray 321 of a discharged sheet stacking portion 320.

At the time of entering the reverse discharge portion 313, the original 101 conveyed by the conveyor belt 309 of the original conveyor 308 is lifted up by the reverse flapper 316 and is conveyed to the reverse roller 314. The original 101 is sandwiched between the reverse roller 314 that rotates counterclockwise (CCW) and the reverse roller 318 that faces the reverse roller 314, and is conveyed to the conveyor roller pair 315. In a case where a rear end of the original 101 passes through the discharge flapper 317, the discharge flapper 317 rotates clockwise (CW). Moreover, the reverse roller 314 also rotates clockwise (CW). Thus, the original 101 is conveyed in a switchback manner, and is discharged to the discharge tray 321 of the discharged sheet stacking portion 320.

In a case where an image on a back side of the original 101 is to be read with the use of the ADF 220, the original 101 is reversed after being scanned on a front side, and the back side is subsequently scanned. This reading system is referred to as "double-side reversal reading." For example, after the front side of the original 101 is scanned, the original 101 is conveyed from the original conveyor 308 to the reverse discharge portion 313, at which the front side and back side of the original 101 are reversed. The reverse discharge portion 313 rotates the reverse roller 314 counterclockwise (CCW) with a part of the original 101 discharged to the discharge tray 321 through the same operation as the one executed in discharging. The original 101 thus enters the original conveyor 308 from the reverse discharge portion 313 with the front side and the back side reversed, to be scanned on the back side.

The ADF 220 may have a configuration including a reading unit that faces the document scanner 210 across the conveying path of the original 101. The reading unit includes a light source configured to irradiate the original 101 with light and a reading sensor configured to generate image data by receiving reflected light that is reflected by the original 101. With this configuration, the front side of the original 101 is read by the document scanner 210 and the back side of the original 101 is read by the reading unit. The operation of reversing the original 101 by the reverse discharge portion 313 is not required in this case. This system of simultaneously scanning the front side and back side of the original 101 during flow reading is referred to as "double-side simultaneous reading."

Detection of Original Size by ADF

As illustrated in FIG. 3C, on the original tray 302 of the original stacker 301, a pair of regulating members 332 slidable in a width direction (Y-direction) of the original 101 are disposed. The regulating members 332 have a function of aligning the position of the original 101 in the width direction at the time of feeding the original 101, which is placed on the original stacker 301 (original tray 302), by regulating both end portions of the original 101 in the width direction. The pair of regulating members 332 is movable symmetrically to each other with respect to the width direction of the original 101. The regulating members 332 regulate the position of the original so that the center of the original 101 in the width direction, which is to be fed, is matched with a feeding center.

The original stacker 301 is provided with an original width sensor 333 capable of detecting the positions of the regulating members 332 (FIG. 3D). The original width sensor 333 detects a size of the original 101 in the width direction, which is placed on the original tray 302, by detecting the positions of the regulating members 332 which move in accordance with the width of the original 101.

On the original stacker 301, a plurality (two in the first embodiment) of original length detection sensors 334*a* and 334*b* are arranged side by side in a feeding direction (SX2-direction) of the original. The original length detection sensors 334*a* and 334*b* detect whether or not the original 101 is present on the original stacker 301 (original tray 302). A size of the original 101 in such an original feeding direction (SX2-direction) of the original 101 is detected based on a detection result of each of the original length detection sensors 334*a* and 334*b*.

The size and orientation (whether the original is longitudinally fed or laterally fed) of the original placed on the original stacker 301 are detectable based on such detection results of the original width sensor 333 and the original length detection sensors 334*a* and 334*b*.

Printer Controller

Figure 4:
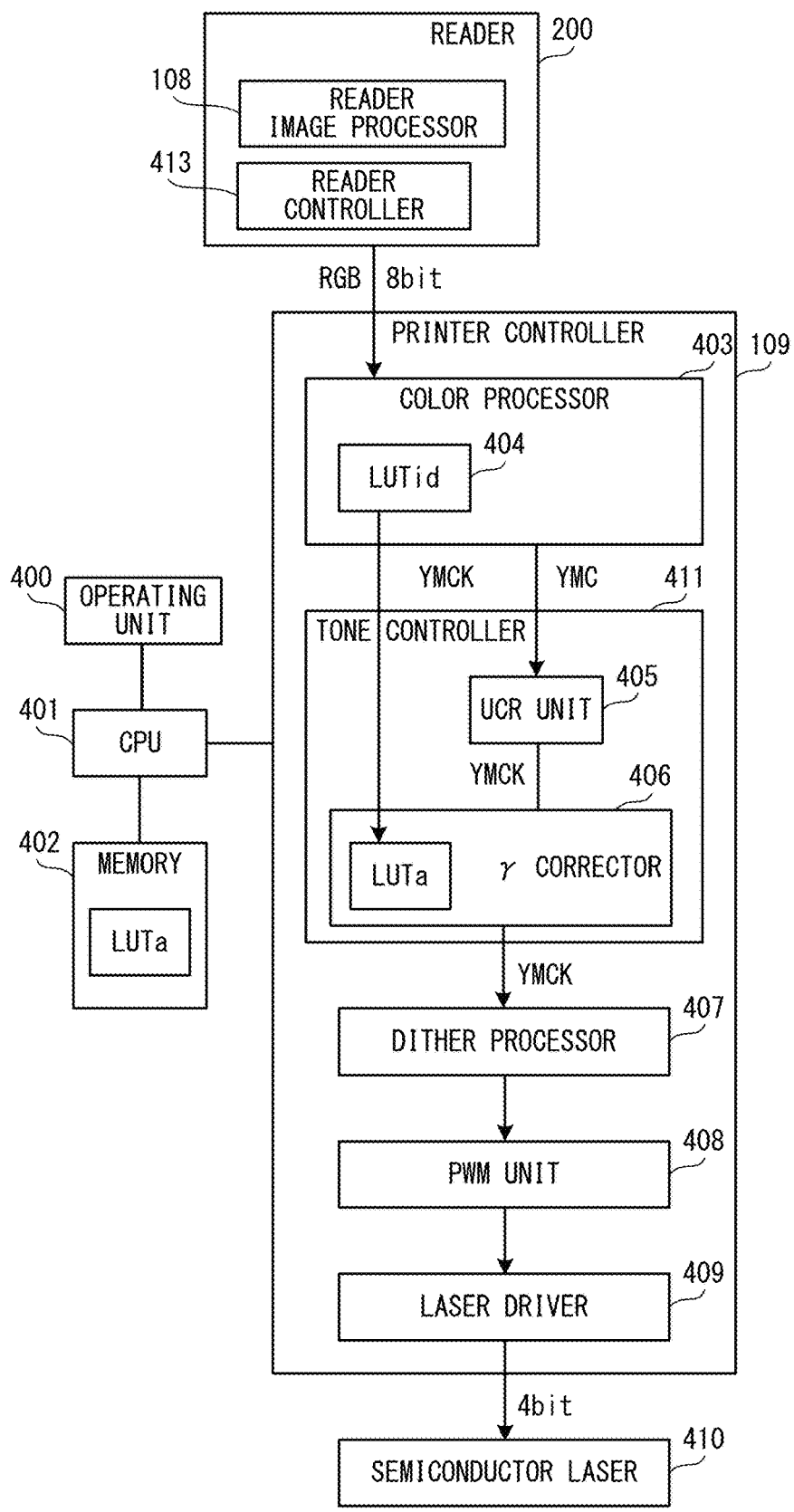
FIG. 4 is an explanatory diagram of a printer controller.

FIG. 4 is an explanatory diagram of the printer controller 109. The following components are connected to the printer controller 109: a central processing unit (CPU) 401 configured to integrally control operations of the image forming apparatus 100; the reader 200; and a semiconductor laser 410. The following components are connected to the CPU 401: a memory 402; and an operating unit 400. The memory 402 includes a read only memory (ROM) and a random access memory (RAM), and stores a control program for controlling the operations of the image forming apparatus 100 and a variety of pieces of data. The CPU 401 executes the control program stored in the memory 402, to thereby control the operations of the image forming apparatus 100. The operating unit 400 is a user interface including an input device and an output device. The input device includes a touch panel, and key buttons such as a start key, a stop key, and a numeric keypad. The output device includes a display and a speaker. The reader 200 includes a reader controller 413 as well as the reader image processor 108 described above. The reader controller 413 is configured to control the operations of each member included in the reader 200.

The printer controller 109 includes a color processor 403, a tone controller 411, a dither processor 407, a pulse width modulation (PWM) unit 408, and a laser driver 409. The printer controller 109 converts respective pieces of image data of green (G), red (R), and blue (B) into PWM signals, and performs light emission control for the semiconductor laser 410 based on the PWM signals. The semiconductor laser 410 is provided inside the exposure device 13, and is configured to emit laser light with which the photosensitive drums 11 are irradiated.

The image data output from the reader image processor 108 of the reader 200 is input to the color processor 403. The color processor 403 performs image processing and color processing on the input image data so that a desired output result (image) can be obtained in a case where the printer 300 has an ideal output characteristic. The color processor 403 increases the number of tone levels of the image data to 10 bits from 8 bits in order to improve the accuracy. The color processor 403 includes an LUTid 404 being a look-up table. The LUTid 404 is a luminance-density conversion table for converting luminance information included in the image data into density information. The color processor 403 uses the LUTid 404 to convert luminance information of each piece of image data of R, G, and B into density information of each piece of image data of Y M, and C. The pieces of image data of Y, M, and C are input to the tone controller 411.

The tone controller 411 corrects tone characteristics of the image data, which are acquired from the color processor 403, with the use of correction conditions corresponding to a type of the sheet on which the image is to be formed. For this purpose, the tone controller 411 includes an under color removal (UCR) unit 405 and a γ corrector 406 including an LUTa being a lookup table. The tone controller 411 corrects the tone of each piece of image data of Y, M, C, and K so that a desired output result (image) can be obtained in accordance with the actual output characteristic of the printer 300. The UCR unit 405 regulates the integrated value (total sum) of the image data in each pixel to limit the total sum of the image data levels to a regulation value or less. In a case where the total sum exceeds the regulation value, the UCR unit 405 performs under color removal (UCR) processing of replacing a predetermined amount of C, M, and Y image data into K image data, to thereby reduce the total sum of the image data levels.

The γ corrector 406 is configured to correct, with the use of the LUTa, density characteristics (γ characteristics) of an image formed on a sheet. The γ corrector 406 converts image data based on a lookup table that corresponds to the type of halftone processing. The LUTa is a 10-bit conversion table (conversion conditions) for correcting the density characteristics. With the printer 300, tone characteristics of an image to be formed on a sheet vary depending on environmental variations and wearing of components. The tone characteristics of the image also vary depending on the type of the sheet. The CPU 401 updates the LUTa by executing tone correction, and maintains the tone characteristics of the image at predetermined tone characteristics. The printer 300 forms the image on the sheet P in accordance with the image data corrected by the γ corrector 406. The memory 402 may hold an LUTa for each type of the sheet. The CPU 401 reads an LUTa corresponding to the type of the sheet, which is designated by the operating unit 400, from the memory 402, and sets the LUTa to the γ corrector 406. The LUTa is used at the time of copying the original and forming the image in accordance with a print job from a host computer, but is not used at the time of executing the tone correction. The pieces of image data of Y, M, C, and K after the tone correction are each input to the dither processor 407.

The dither processor 407 performs dither processing (halftone processing) on the pieces of 10-bit image data of Y, M, C, and K subjected to tone correction, to thereby convert the respective pieces of 10-bit image data of Y, M, C, and K into 4-bit signals. The PWM unit 408 performs pulse width modulation on the signals subjected to dither processing to generate the PWM signal corresponding to the control signal for the exposure device 13. The PWM signal is input to the laser driver 409. The laser driver 409 controls the light emission of the semiconductor laser 410 in accordance with the PWM signal.

Adjustment of Characteristics of Image Forming Apparatus

The image forming apparatus 100 can perform quality adjustment and image diagnosis on an image formed by the printer 300, with the use of a test chart. The image forming apparatus 100 reads a test chart with the reader 200, and performs characteristics adjustment and image diagnosis based on the result of the reading. Through characteristics adjustment, a plurality of types of adjustment factors, for example, tone, in-plane density unevenness, geometric characteristics, and transfer output (a secondary transfer voltage), are adjusted. Through image diagnosis, an image is diagnosed for image failures, for example, point image/streaked image, and double-side reading color correction. The test chart is created by forming image data that corresponds to the types of characteristics adjustment and image diagnosis on the sheet P.

Tone Correction

Tone correction is executed in a case where reproducibility of the density or hue of an image formed by the printer 300 drops. To execute tone correction, a test chart for tone correction, which is formed by the printer 300, is read with the reader 200 and an LUTa for correcting density characteristics (γ characteristics) is created based on the result of the reading.

Figure 5:
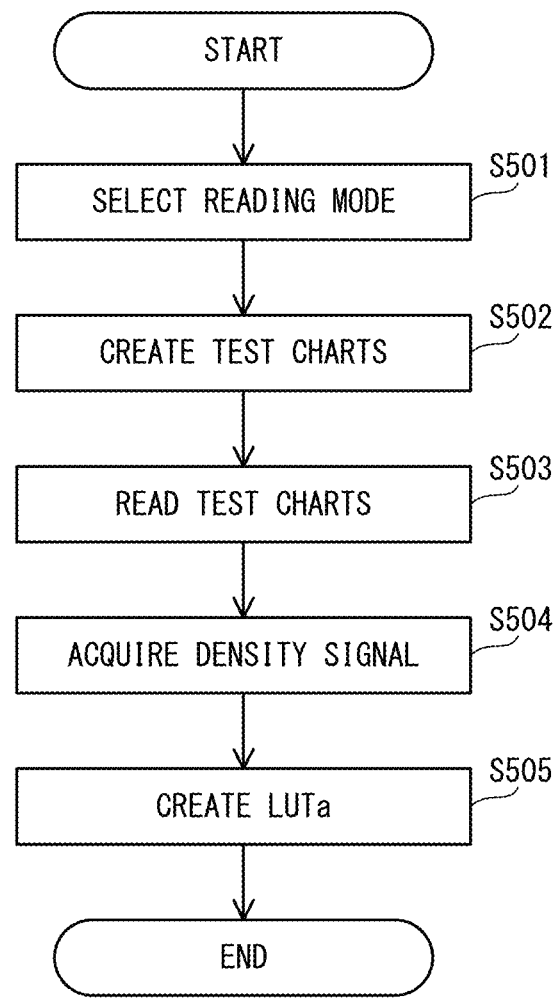
FIG. 5 is a flow chart for illustrating tone correction processing.
Figure 6A:
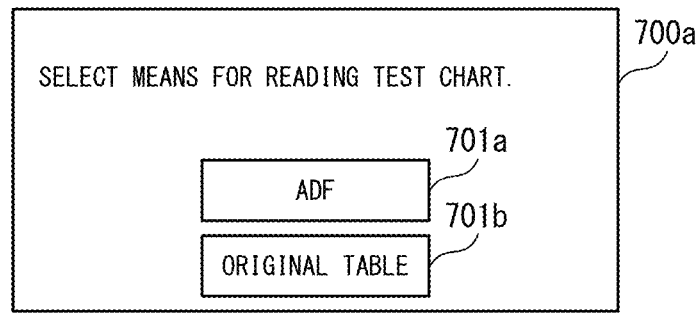
FIG. 6A, FIG. 6B, and FIG. 6C are exemplary illustrations of screens displayed during tone correction processing.
Figure 6B:
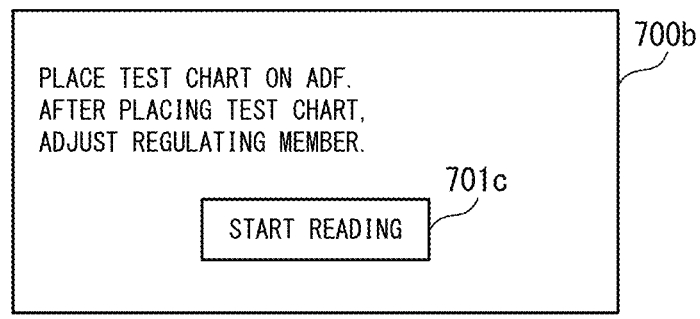
Figure 6C:
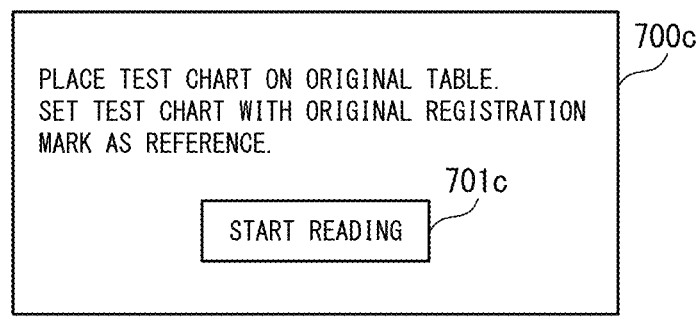
Figure 7:
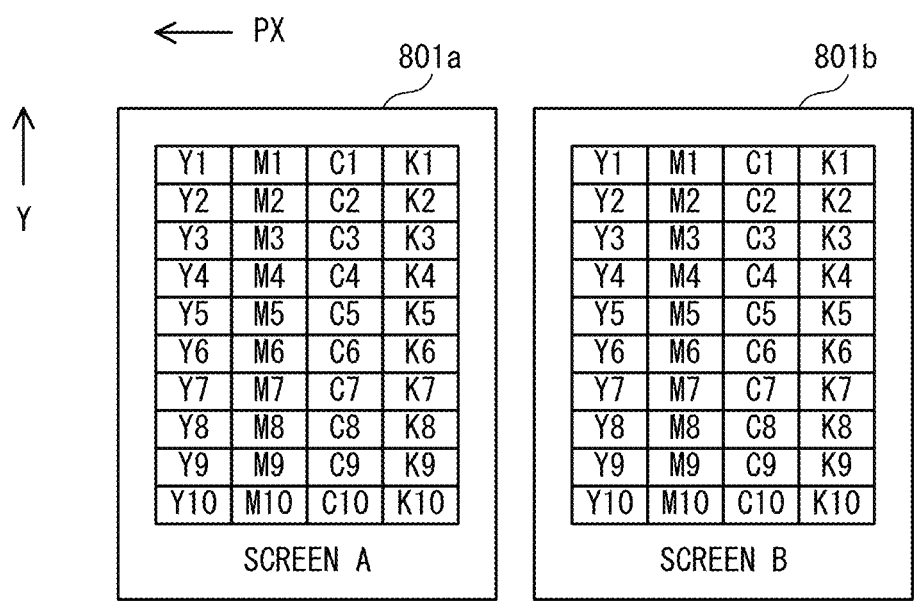
FIG. 7 is an exemplary illustration of test charts for use in tone correction.

FIG. 5 is a flow chart for illustrating tone correction processing. FIG. 6A to FIG. 6C are exemplary illustrations of screens to be displayed on a display of the operating unit 400 during the tone correction processing. FIG. 7 is an exemplary illustration of test charts for use in the tone correction.

From the operating unit 400, the CPU 401 acquires a signal that indicates which reading mode between the ADF reading and the original table reading is selected by the user (Step S501). Ina case where the ADF reading is selected by the user, the CPU 401 operates in the first reading mode. In a case where the original table reading is selected by the user, the CPU 401 operates in the second reading mode. FIG. 6A is an exemplary illustration of an operation screen 700a at the time of selecting the reading mode. The CPU 401 displays the operation screen 700a on the display of the operating unit 400. On the operation screen 700a, a button 701a allowing selection of the ADF reading and a button 701b allowing selection of the original table reading are displayed. The user selects any one of the button 701a and the button 701b through the operating unit 400, to thereby select the reading mode. From the operating unit 400, the CPU 401 acquires a signal indicating the selected reading mode.

Once a reading mode is selected, the CPU 401 uses the printer 300 to create a test chart for tone correction, an example of which is illustrated in FIG. 7 (Step S502). For that purpose, the CPU 401 transmits a density signal of a test image for creating the test chart to the dither processor 407. The LUTa is not used at this point. In a case where a plurality of test charts are required, printing operation differs between a case in which the reading mode selected in Step S501 is the ADF reading and a case in which the reading mode selected in Step S501 is the original table reading. In the case of the ADF reading, a plurality of test charts are printed in succession. In the case of the original table reading, printing of one test chart is alternated with original table reading.

As illustrated in FIG. 7, each of test charts 801a and 801b includes test images formed of 10 tones for each color of Y, M, C, and K. For each color, for example, images of 10 tones are formed of density signals of 10%, 20%, 30%, 40%, 50%, 60%, 70%, 80%, 90%, and 100%. The dither processor 407 can apply a plurality of procedures of halftone processing. For example, the dither processor 407 includes a small number-of-line screen (160 lines per each (lpi) to 180 lpi) and a large number-of-line screen (250 lpi to 300 lpi). The test chart 801a is a test chart to which the small number-of-line screen is applied. The test chart 801b is a test chart to which the large number-of-line screen is applied. The small number-of-line screen is applied to printing, and the large number-of-line screen is applied to copying. In a case where the printer 300 has an ability to form an image with three types or more of the number of lines, the number of the types of test charts may also be three or more. The image forming apparatus includes lookup tables corresponding to the types of halftone processing. The image forming apparatus therefore generates a lookup table corresponding to the large number-of-line screen and a lookup table corresponding to the small number-of-line screen. Here, the number of test charts formed in a case where tone correction is executed is one for the sake of convenience of description. That is, the tone correction processing of FIG. 5 is separately executed for each screen with which the user performs tone correction.

After the test chart is created, the CPU 401 reads the test chart with the reader 200 through processing corresponding to the reading mode (Step S503).

In a case where the reading mode is the ADF reading, the CPU 401 displays, on the display of the operating unit 400, a message prompting the user to place the test chart on the original tray 302 of the ADF 220. FIG. 6B is an exemplary illustration of such a message screen 700b. On the message screen 700b, the message for prompting the user to place the test chart on the original tray 302 and a button 701c for giving an instruction to start the reading are displayed. After placing the test chart on the original tray 302, the user presses the button 701c through the operating unit 400, to thereby give an instruction to start the ADF reading. Thus, the CPU 401 acquires from the operating unit 400 such an instruction to start the reading in the ADF reading.

When acquiring the instruction to start the reading, the CPU 401 instructs the reader 200 to perform the ADF reading. The reader 200 conveys the test chart with the ADF 220, and reads the test chart with the document scanner 210. The reader image processor 108 of the document scanner 210 transmits image data including a luminance signal, which indicates a reading result of the test chart, to the printer controller 109. When there are a plurality of test charts, the document scanner 210 reads, in succession, the plurality of test charts conveyed in succession by the ADF 220. The reader image processor 108 transmits, in succession, pieces of image data including luminance signals that indicate reading results of the test charts read in succession to the printer controller 109.

In a case where the reading mode is the original table reading, the CPU 401 displays, on the display of the operating unit 400, a message prompting the user to place the test chart on the platen 102. FIG. 6C is an exemplary illustration of such a message screen 700c. On the message screen 700c, the message for prompting the user to place the test chart on the platen 102 and the button 701c for giving an instruction to start the reading are displayed. The user opens the ADF 220 to expose the platen 102, and places, on the platen 102, the test chart with a surface on which the test image is formed directed to the platen 102. The user thereafter presses the button 701c through the operating unit 400, to thereby give an instruction to start the original table reading. Thus, the CPU 401 acquires from the operating unit 400 such an instruction to start the reading in the original table reading.

When acquiring the instruction to start the reading, the CPU 401 instructs the reader 20 to perform the original table reading. The reader 200 reads the test chart on the platen 102 with the document scanner 210. The reader image processor 108 of the document scanner 210 transmits image data including a luminance signal, which indicates a reading result of the test chart, to the printer controller 109. When there area plurality of test charts, one test chart is placed on the platen 102 at a time, and the document scanner 210 reads the placed test chart. The reader image processor 108 transmits image data including a luminance signal that indicates the result of reading one test chart at a time to the printer controller 109.

The CPU 401 acquires the density signals of the test image based on the reading result (luminance signals) (Step S504). The CPU 401 converts the luminance signals into the density signals with the use of the LUTid 404 of the color processor 403. Thus, a density signal for each of the images of 10 tones is obtained. The CPU 401 may switch the tables of the LUTid 404 of the color processor 403 depending on the type of the sheet for use in the test chart.

The CPU 401 creates the LUTa based on the density signals used to create the test image and the density signals obtained from the reading result of the test chart (Step S505). The CPU 401 stores the created LUTa in the memory 402. The tone correction processing is performed as described above.

In-Plane Density Unevenness Correction

In-plane density unevenness correction is executed in order to correct unevenness in image density within an area of the sheet P in which an image is formed. Density unevenness in the main scanning direction (Y-direction) of the printer 300 is caused by, for example, charge unevenness due to deterioration of the charger 12 configured to charge surfaces of the photosensitive drums 11, exposure unevenness of laser light by the exposure device 13, or development unevenness by the developer 14.

Figure 8A:
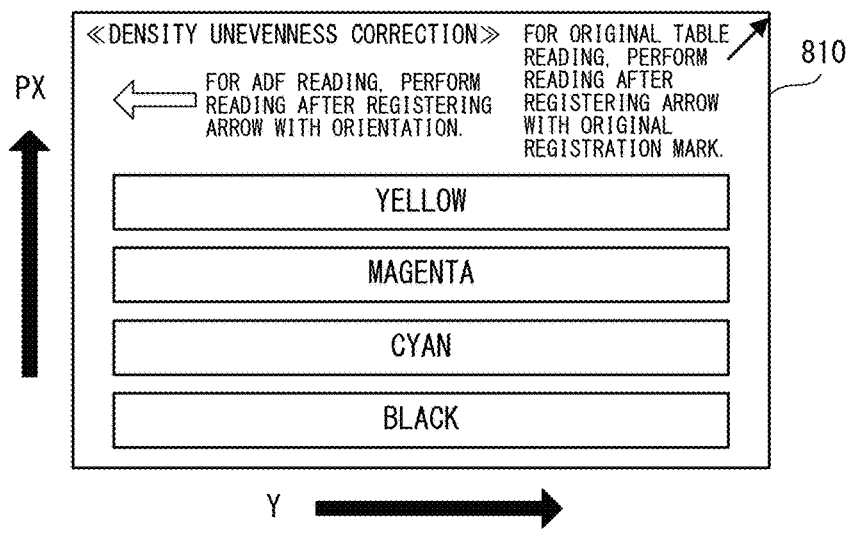
FIG. 8A and FIG. 8B are explanatory diagrams of test charts for density unevenness correction.
Figure 8B:
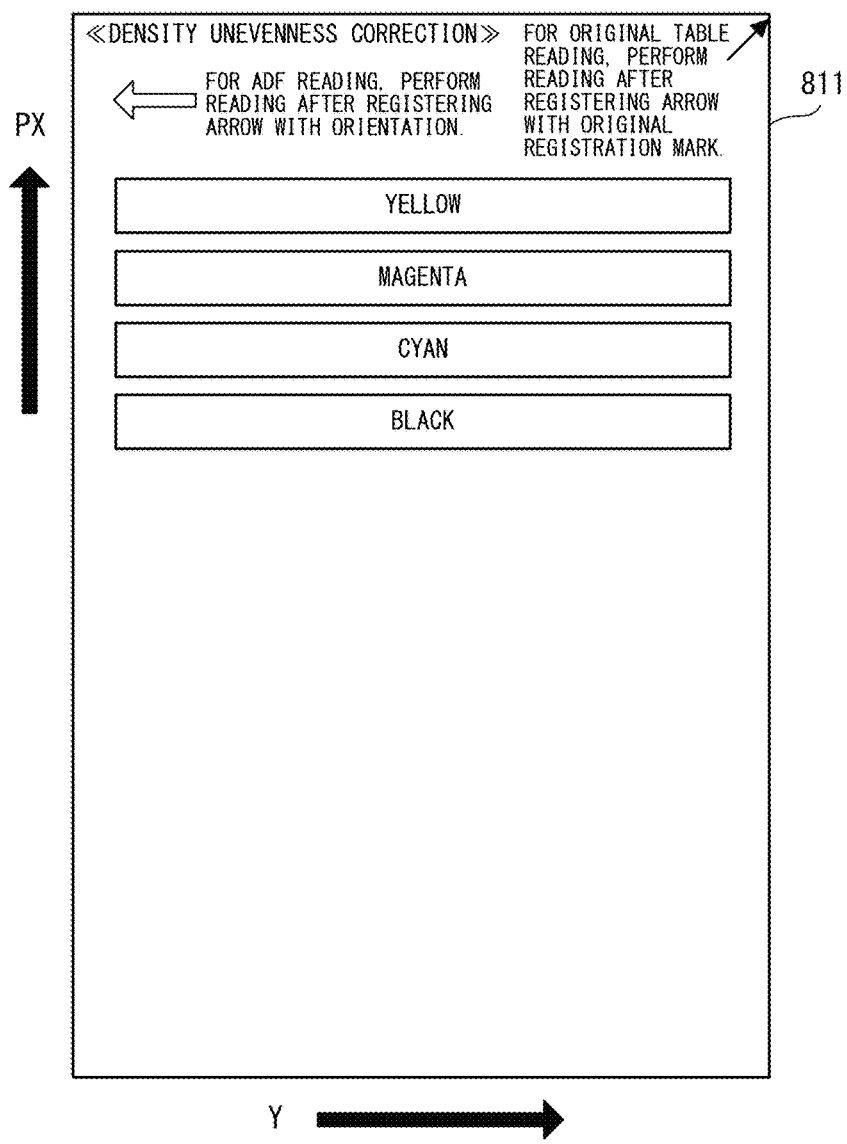

In the case of correcting such density unevenness in the main scanning direction, a test chart for density unevenness correction is created. FIG. 8A and FIG. 8B are explanatory diagrams of test charts for density unevenness correction. In FIG. 8A, an example of a test chart 810 for the A4 size is illustrated. In FIG. 8B, an example of a test chart 811 for the A3 size is illustrated. In each of the test charts 810 and 811, band-shaped test images in the colors yellow, magenta, cyan, and black, respectively, are formed in the main scanning direction (Y-direction). The test images are formed from 50%-density signals. The band-shaped test images are formed so that a longitudinal direction of the bands is the main scanning direction, regardless of the sheet size.

The test charts 810 and 811 for density unevenness correction are recommended to be read with the test charts 810 and 811 set so that the main scanning direction (Y-direction) of the test charts 810 and 810 is parallel to the SX1-direction or SX2-direction of the reader 200. This is because the image sensor 105 includes photoelectric conversion elements arrayed linearly side by side in the main scanning direction, and characteristics of the photoelectric conversion elements differ depending on positions of the photoelectric conversion elements in the Y-direction. The reader 200 can reduce differences in characteristics due to the positions of the photoelectric conversion elements of the image sensor 105 by reading the test charts 810 and 811 with the main scanning direction of the test charts 810 and 811 set along the SX1-direction or SX2-direction of the reader 200. The reading direction of the test charts 810 and 811 for density unevenness correction is not required to be limited in a case where influence of the differences in characteristics due to the positions of the photoelectric conversion elements of the image sensor 105 is small.

The density unevenness is corrected by performing feedback correction of the amount of exposure with laser light in the main scanning direction (Y-direction) so as to cancel out density unevenness in the main scanning direction (Y-direction) that is detected from the result of reading the test charts 810 and 811 for density unevenness correction. The test charts for density unevenness correction are read with the reader 200 by ADF reading (the first reading mode) or original table reading (the second reading mode) as in tone correction.

Geometric Characteristics Adjustment

Geometric characteristics adjustment is executed in a case where geometric characteristics are caused to deviate by the sheet's expansion/shrinkage, cutting precision, or storage conditions. The amount of deviation in geometric characteristics heavily depends on physical characteristics of a sheet to be printed thereon. It is therefore preferred to execute geometric characteristics adjustment suited to the type of the sheet.

Figure 9:
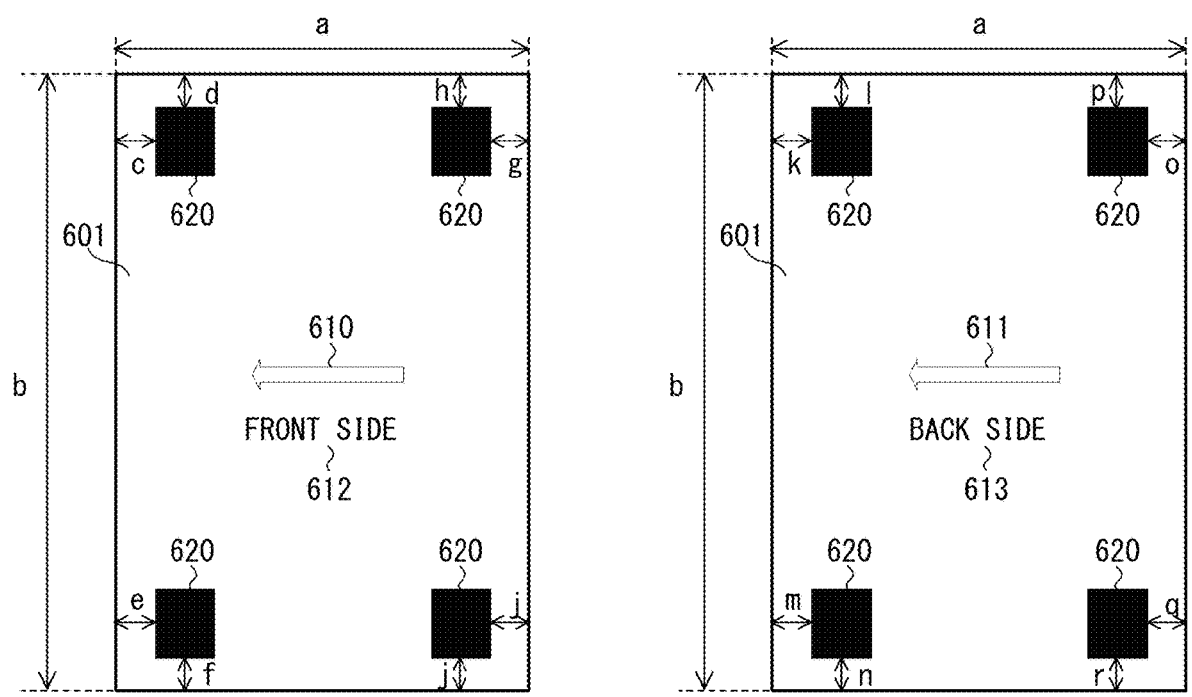
FIG. 9 is an explanatory diagram of a printing position adjustment chart.

FIG. 9 is an explanatory diagram of a printing position adjustment chart, which is a test chart for geometric characteristics adjustment. Image data of a printing position adjustment chart 601 is stored in the memory 402. The CPU 401 reads the image data of the printing position adjustment chart 601 out of the memory 402 in a case where the printing position adjustment chart 601 is to be printed, and transfers the image data to the printer controller 109.

The printing position adjustment chart 601 is configured by forming marks 620 at predetermined positions on the front side and back side of a sheet. In the first embodiment, the marks 620 are formed in four corners on both sides of the printing position adjustment chart 601, that is, eight marks 620 in total. The marks 620 are formed in a color that has a large difference in reflectance from the color of the sheet. For instance, the marks 620 are formed in black for a white-colored sheet.

An image 610 for discerning a conveying direction in reading and an image 612 for discriminating the front and the back are printed on the front side of the printing position adjustment chart 601. An image 611 for discerning a conveying direction in reading and an image 613 for discriminating the front and the back are printed on the back side of the printing position adjustment chart 601. That is, the image 610 and the image 612 are printed on the front side of the printing position adjustment chart 601 and the image 611 and the image 613 are printed on the back side thereof in a case where positioning of images on both sides is to be executed. In a case where the position of an image on one side is to be adjusted, the image 610 and the image 612 are printed on the front side of the printing position adjustment chart 601.

It is sufficient to print the images 610 and 611 for discerning the conveying direction of the printing position adjustment chart 601 in the case of reading the printing position adjustment chart 601 by ADF reading, and printing of the images 610 and 611 may be omitted in the case of reading the printing position adjustment chart 601 by fixed reading. The images 610 and 611 are arrows by which the user can discern the conveying direction of the printing position adjustment chart 601. The images 612 and 613 are characters by which the user can discriminate the front side and back side of the printing position adjustment chart 601.

The marks 620 that are formed at ideal positions are formed at a predetermined distance from sheet end portions of the printing position adjustment chart 601. The amount of deviation in geometric characteristics on the front side of the sheet is detected by measuring the positions of the marks 620 that are printed on the front side of the printing position adjustment chart 601. The amount of deviation in geometric characteristics on the back side of the sheet is detected by measuring the positions of the marks 620 that are printed on the back side of the printing position adjustment chart 601. The amount of deviation in printing position on the back side with respect to geometric characteristics on the front side, or the amount of deviation in geometric characteristics on the front side with respect to the printing position on the back side is detected by measuring relative positions of the marks 620 printed on the front side and back side of the printing position adjustment chart 601.

In geometric characteristics adjustment using the printing position adjustment chart 601, distances "a" to "j" on the front side and distances "k" to "r" on the back side are measured in order to measure the positions of the marks 620. The distance "a" is the length of the printing position adjustment chart 601 in the sub-scanning direction, and the distance "b" is the length of the printing position adjustment chart 601 in the main scanning direction. An ideal length of the distance "a" and an ideal length of the distance "b" are registered in advance in the image forming apparatus 100. The distances "c" to "r" are each a length from the relevant one of the marks 620 to an end portion of the printing position adjustment chart 601 that is closest to the relevant mark 620.

Methods of measuring the distances "a" to "r" include a manual measurement method and an automatic measurement method. In the manual measurement method, the user actually measures the lengths of the distances "a" to "r" by placing a ruler on the printing position adjustment chart 601. The user inputs the actually measured lengths to the image forming apparatus 100 with the operating unit 400.

In the automatic measurement method, the printing position adjustment chart 601 is read (scanned) by the reader 200. The CPU 401 analyzes image data that is the result of reading the printing position adjustment chart 601, and detects density differences from pixel to pixel in the read image. The CPU 401 detects end portions of the printing position adjustment chart 601 and edges of the marks 620 (namely, boundaries between the base of the printing position adjustment chart 601 and the marks 620) from the density differences. The CPU 401 calculates the distances "a" to "r" based on the detected end portions of the printing position adjustment chart 601 and the detected edges of the marks 620.

FIG. 10 is an explanatory table of a method of detecting the amount of deviation in geometric characteristics from the measured distances "a" to "r". In the first embodiment, a calculation table 1300 is used to detect the amount of deviation in geometric characteristics. The calculation table 1300 is stored in the memory 402. The CPU 401 calculates the amount of deviation in geometric characteristics based on the calculation table 1300.

The calculation table 1300 is defined by a measurement value 1310, an ideal value 1311, and a position deviation amount 1312 of the printing position in terms of "lead position," "side position," "main scanning magnification," and "sub-scanning magnification" on the front side and back side of the printing position adjustment chart 601. The position deviation amount 1312 of the printing position is expressed by a conversion formula using the measurement value 1310 and the ideal value 1311.

The measurement value 1310 of the "lead position" on the front side of the printing position adjustment chart 601 is calculated from actually measured values of the distances "c" and "e" of FIG. 9 with the use of a conversion formula shown in the calculation table 1300. The lead position is a mean value of distances from an end portion of the printing position adjustment chart 601 on the head side in the sheet conveying direction to the marks 620 that correspond to the end portion.

The measurement value 1310 of the "side position" on the front side of the printing position adjustment chart 601 is calculated from actually measured values of the distances "f" and "j" of FIG. 9 with the use of a conversion formula shown in the calculation table 1300. The side position is a mean value of distances from the end portion of the printing position adjustment chart 601 on the left side in the sheet conveying direction to the marks 620 that correspond to the end portion.

As shown in the calculation table 1300, the ideal value 1311 of each of the "lead position" and the "side position" is 1 cm. That is, ideally, the marks 620 are each printed at a position distanced by 1 cm from a corresponding end portion of the printing position adjustment chart 601.

The measurement value 1310 of the "main scanning magnification" on the front side of the printing position adjustment chart 601 is calculated from actually measured values of the distances "b", "d", "f", "h", and "j" of FIG. 9 with the use of a calculation formula shown in the calculation table 1300. The main scanning magnification is a mean value of distances between the marks 620 that are aligned along the same scanning line in the main scanning direction.

The measurement value 1310 of the "sub-scanning magnification" on the front side of the printing position adjustment chart 601 is calculated from actually measured values of the distances "a", "c", "e". "g", and "i" of FIG. 9 with the use of a calculation formula shown in the calculation table 1300. The sub-scanning magnification is a mean value of distances between the marks 620 that are aligned along the same scanning line in the sub-scanning direction.

As shown in the calculation table 13x), the ideal value 1311 of the "main scanning magnification" is a value obtained by subtracting 2 cm from a sheet length in the main scanning direction, which is registered for each sheet in advance in the image forming apparatus 100. Similarly, the ideal value 1311 of the "sub-scanning magnification" is a value obtained by subtracting 2 cm from a sheet width in the sub-scanning direction, which is registered for each sheet in advance in the image forming apparatus 100.

The position deviation amount 1312 on the back side of the printing position adjustment chart 601 is calculated by the same conversion formulae as those for the front side.

As shown in the calculation table 1300, for each of the "lead position," the "side position," the "main scanning magnification," and the "sub-scanning magnification," the position deviation amount 1312 of the printing position is calculated with the use of the corresponding measurement value 1310 and ideal value 1311. For the "lead position" and the "side position," the position deviation amount 1312 is calculated (in units of mm) by subtracting the ideal value 1311 from the measurement value 1310. For the "main scanning magnification" and the "sub-scanning magnification," the position deviation amount 1312 is calculated (in percentage) by subtracting the ideal value 1311 from the measurement value 1310 and dividing the difference by the ideal value 1311. The position deviation amount 1312 calculated in the manner described above is stored in the memory 402 as attribute data of the sheet. The printer controller 109 performs affine transformation on the image data to correct geometric characteristics of an image to be formed on the sheet. The printer 300 can form an image having ideal geometric characteristics by forming an image on the sheet based on the image data for which affine transformation has been executed.

Transfer Output Adjustment

Transfer output adjustment (secondary transfer voltage adjustment) is executed in a case where a transfer failure occurs in secondary transfer. In transfer output adjustment, transfer output (a secondary transfer voltage) is adjusted based on the result of reading, with the reader 200, a test chart for transfer output adjustment. The secondary transfer voltage is applied in secondary transfer, and the secondary transfer device 27 uses an electric field generated by the secondary transfer voltage to move the toner image on the intermediate transfer belt 31 to the sheet P. An optimum voltage value of the secondary transfer voltage varies depending on physical properties (surface properties, the resistance of the sheet) of a sheet to which the toner image is to be transferred. It is therefore preferred to adjust the secondary transfer voltage based on the type of the sheet.

Figure 11:
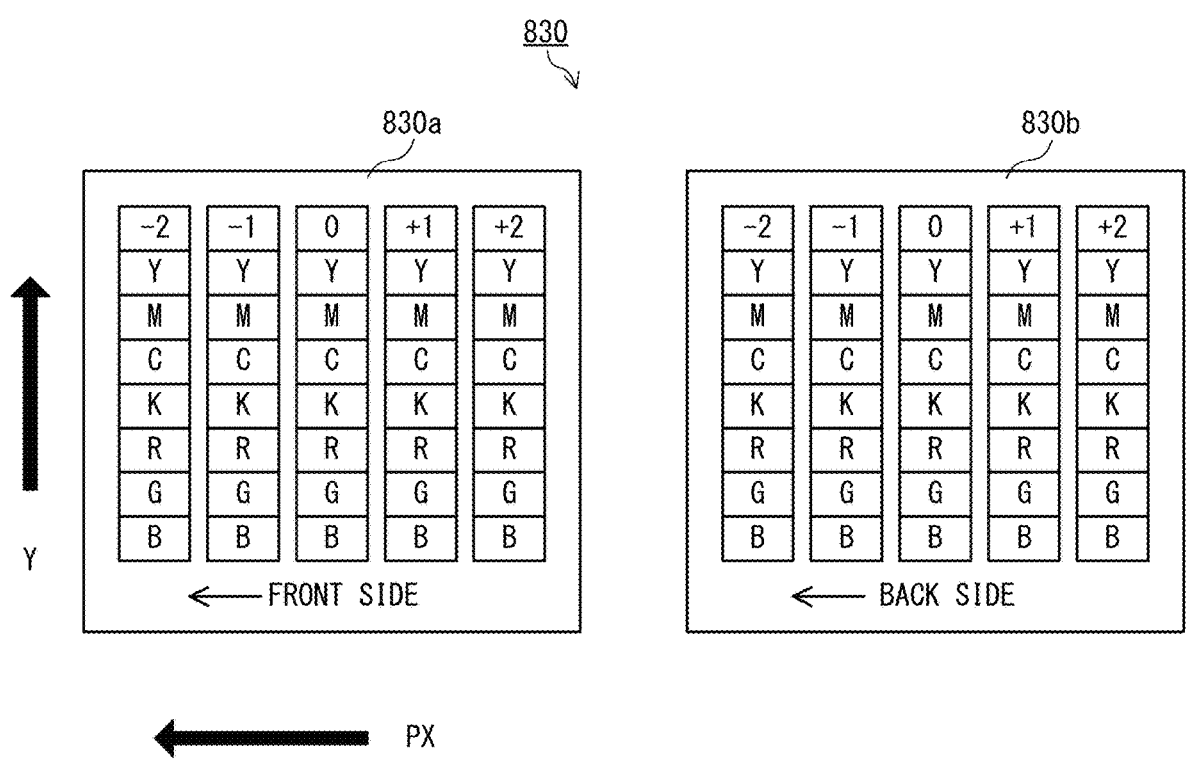
FIG. 11 is an explanatory diagram of a transfer output adjustment chart.

FIG. 11 is an explanatory diagram of a transfer output adjustment chart, which is a test chart for transfer output adjustment. Image data of a test image of a transfer output adjustment chart 830 is stored in the memory 402. The CPU 401 reads the image data of the transfer output adjustment chart 830 out of the memory 402 in a case where the transfer output adjustment chart 830 is to be created, and transfers the image data to the printer controller 109.

The transfer output adjustment chart 830 includes a test image 830a formed on a front side of a sheet and a test image 830b formed on a back side of the sheet. The test images 830a and 830b each include patch images in seven colors, namely, yellow (Y) patch images, magenta (M) patch images, cyan (C) patch images, and black (K) patch images that are formed from density signals indicating 100%, and red (R) patch images, green (G) patch images, and blue (B) patch images. The red patch images are formed by overlapping a yellow image and a magenta image that are each formed from a density signal indicating 100%. The green patch images are formed by overlapping a yellow image and a cyan image that are each formed from a density signal indicating 100%. The blue patch images are formed by overlapping a magenta image and a cyan image that are each formed from a density signal indicating 100%.

The patch images in seven colors are each formed at voltage values of the five levels (−2, −1, 0, +1, +2) of the secondary transfer voltage. The five levels of the secondary transfer voltage are, for example, 2,000 V, 2,250 V, 2,500 V, 2,750 V. and 3,000 V. Here, the test images 830a and 830b are formed by changing the secondary transfer voltage to a level that is the same on the front side and back side of the transfer output adjustment chart 830. However, the level of the secondary transfer voltage may be changed on the front side and the back side.

The test images 830a and 830b on the front side and back side of the transfer output adjustment chart 830 are read with the reader 200 by ADF reading (the first reading mode) or original table reading (the second reading mode). The reader 200 acquires luminance values of the patch images by reading the transfer output adjustment chart 830. In the first embodiment, a level of the secondary transfer voltage at which a mean luminance value of each of yellow, magenta, cyan, black, red, green, and blue is smallest is set as an adjustment value for adjusting transfer output. The adjustment value may differ between the front side and the back side. Comparison after weighting that is varied depending on color may be employed instead of the mean luminance value of each of yellow, magenta, cyan, black, red, green, and blue.

Point Image/Streaked Image Diagnosis

Point image/streaked image diagnosis is executed to determine which of the reader 200 and the printer 300 is the cause of a point image, a streaked image, or other image failures that have occurred in an image formed on the sheet.

Figure 12A:
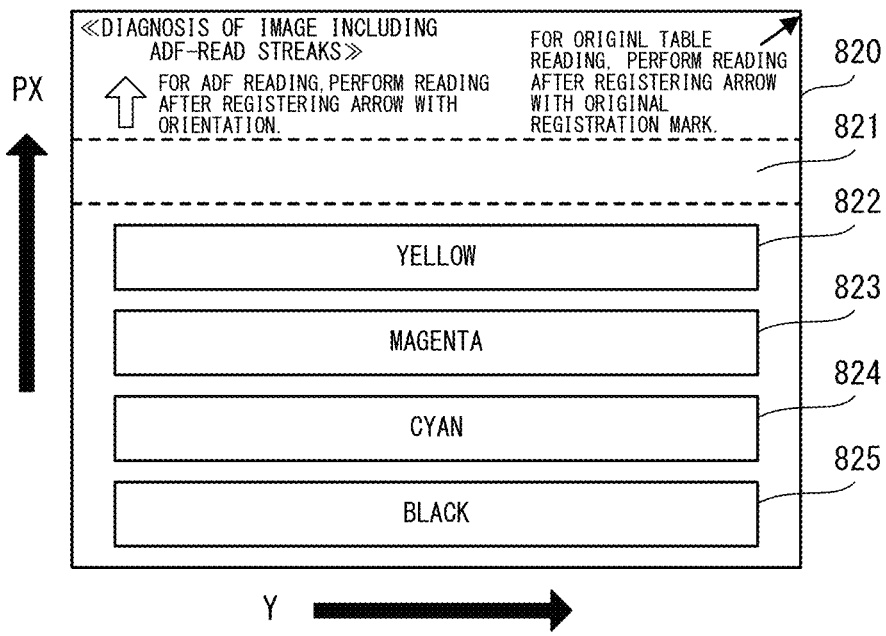
FIG. 12A and FIG. 12B are explanatory diagrams of a test chart for point image/streaked image diagnosis.
Figure 12B:
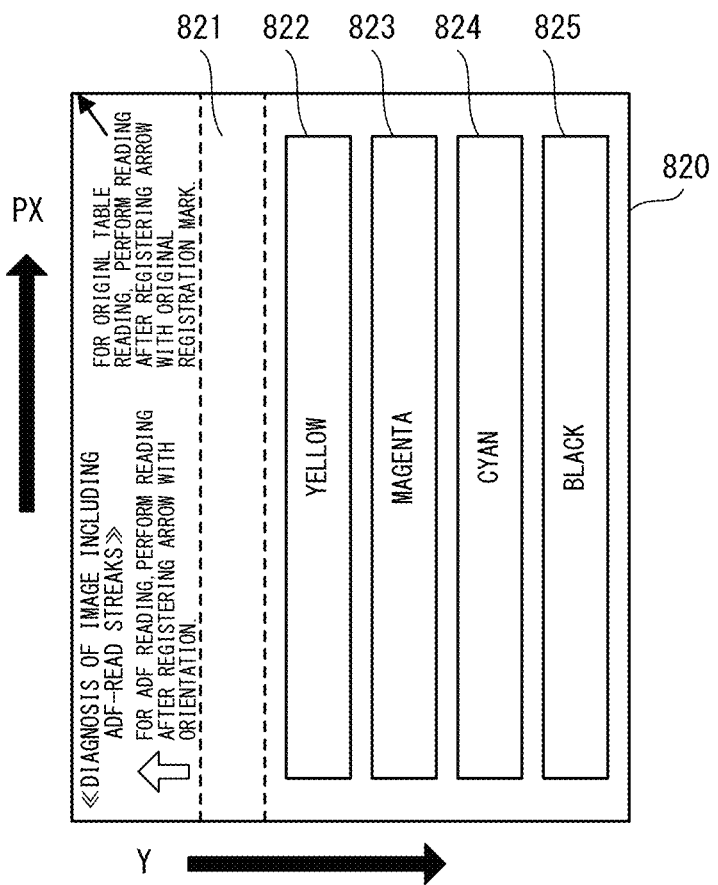

FIG. 12A and FIG. 12B are explanatory diagrams of a test chart for point image/streaked image diagnosis to be used in "image failure diagnosis including detection of ADF-read streaks." A test chart 820 for image diagnosis includes a blank portion 821 in which no image is formed and band-shaped test images 822, 823, 824, and 825, which are formed in yellow, magenta, cyan, and black, respectively, from density signals indicating 50%.

FIG. 12A is exemplary illustration of the test chart 820 for point image/streaked image diagnosis that is an A4-sized sheet with the test images 822, 823, 824, and 825 formed thereon. In this test chart 820, the test images 822, 823, 824, and 825 are formed so that longer sides of the band-shaped test images are parallel to the Y-direction. FIG. 12B is an exemplary illustration of the test chart 820 for point image/streaked image diagnosis that is an A4R-sized sheet with the test images 822, 823, 824, and 825 formed thereon. In this test chart 820, the test images 822, 823, 824, and 825 are formed so that shorter sides of the band-shaped test images are parallel to the Y-direction.

It is preferred to read the test chart 820 for point image/streaked image diagnosis with the test chart 820 set in the original tray 302 in a direction in which the chart's longitudinal direction (the longer sides of the sheet) is parallel to the Y-direction, irrespective of whether the test chart 820 is an A4-sized sheet or an A4R-sized sheet.

Figures 13, 14:
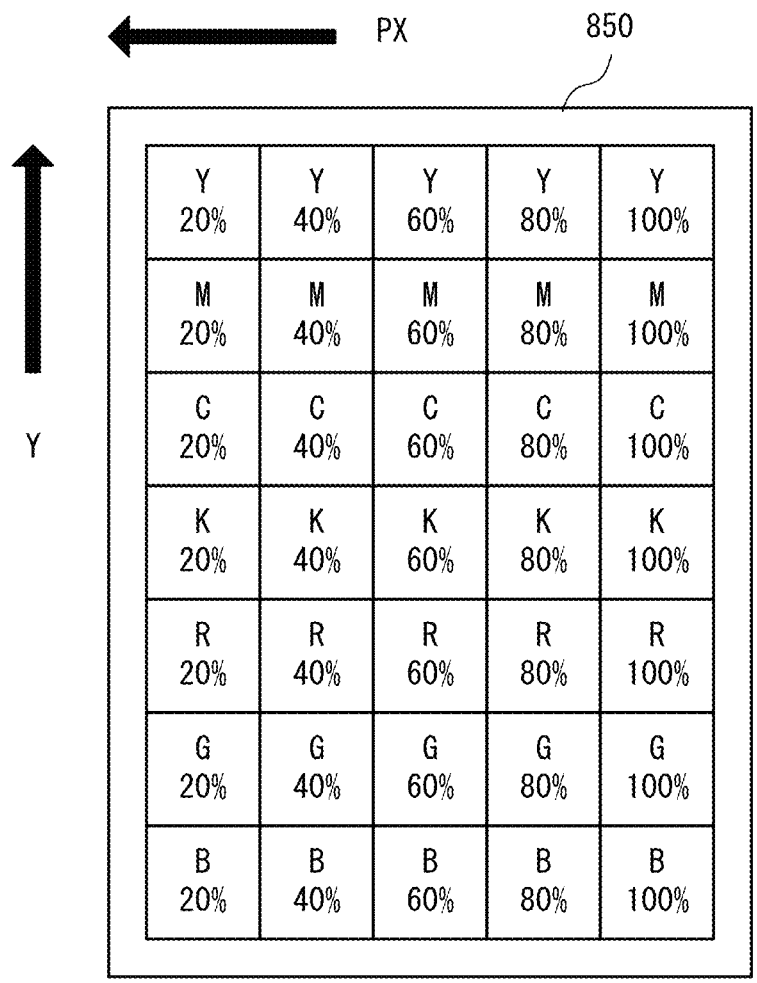
FIG. 13 is an explanatory table of a relationship between a position of detection of a streak and a cause of the streak.
FIG. 14 is an explanatory diagram of a double-side reading color correction chart.

In the determination of the presence or absence of ADF-read streaks, in a case where streaks are detected before the test chart 820 is conveyed to the reading position of the reader 200 and in the blank portion 821 of the test chart 820, it means that there are streaks to be detected with or without the test chart 820. In this case, it is determined that streaks have been caused by the reader 200. In a case where no streaks are detected before the test chart 820 is conveyed to the reading position of the reader 200 and streaks are detected in the blank portion 821 of the test chart 820, it is determined that there are streaks in the blank portion 821 of the test chart 820, not streaks caused by the reader 200. The streaks in this case are determined to be streaks caused by the printer 300. FIG. 13 is an explanatory table of this relationship between the position of detection of a streak and the cause of the streak.

In order to separate a streaked image caused by the reader 200 and a streaked image caused by the printer 300, image diagnosis is preferred to be performed in a wider reading region (in the Y-direction) of the reader 200. To that end, the test chart 820 is set in a direction in which the chart's longitudinal direction (the longer sides of the sheet) is parallel to the Y-direction.

Double-Side Reading Color Correction

Double-side reading color correction is executed for the purpose of adjusting read colors on the front side and back side of a sheet in a case where parts of the reader 200 are replaced or maintenance work is performed on the reader 200.

FIG. 14 is an explanatory diagram of a double-side reading color correction chart, which is a test chart for double-side reading color correction. A test image of a double-side reading color correction chart 850 includes yellow (Y) patch images, magenta (M) patch images, cyan (C) patch images, black (K) patch images, red (R) patch images, green (G) patch images, and blue (B) patch images. In the first embodiment, the patch images have five tones in which a density signal indicates one of 20%, 40%, 60%, 80%, and 100%. The test image includes thirty-five patch images. The double-side reading color correction chart 850 in the first embodiment is two test charts in which the test image is printed in succession on two sheets on one side.

Double-side reading color correction is executed in a manner described below.

The printer 300 creates two double-side reading color correction charts 850 by forming the test image in succession on sheets of the same type on one side. One double-side reading color correction chart 850 out of the two is set on the original tray 302 of the ADF 220 with the side on which the test image has been formed facing upward. Next, another double-side reading color correction chart 850 of the two is set in the original tray 302 with the side on which the test image has been formed facing downward. The two double-side reading color correction charts 850 are set on the original tray 302 on top of each other.

The two double-side reading color correction charts 850 are read in succession by the ADF reading (the first reading mode). Luminance values of the patch images in each double-side reading color correction chart 850 of the two are thus acquired. A coefficient for correcting the result of reading one double-side reading color correction chart 850 is derived so that the luminance values of the patch images in the first double-side reading color correction chart 850 and the luminance values of the patch images in the second double-side reading color correction chart 850 are close to each other. This coefficient is stored in the memory 402 as a double-side reading color correction coefficient to be used for double-side reading color correction.

Collective Adjustment Mode

The adjustment and image diagnosis processing described above are executable at once on the user's instruction. An operation mode in which the processing is executed at once is referred to as "collective adjustment mode." In the first embodiment, execution of a type of adjustment and image diagnosis processing that is not intended by the user can be prevented even when the user instructs to execute the collective adjustment mode by enabling the user to select a type (an item) of correction to be executed.

Figure 15:
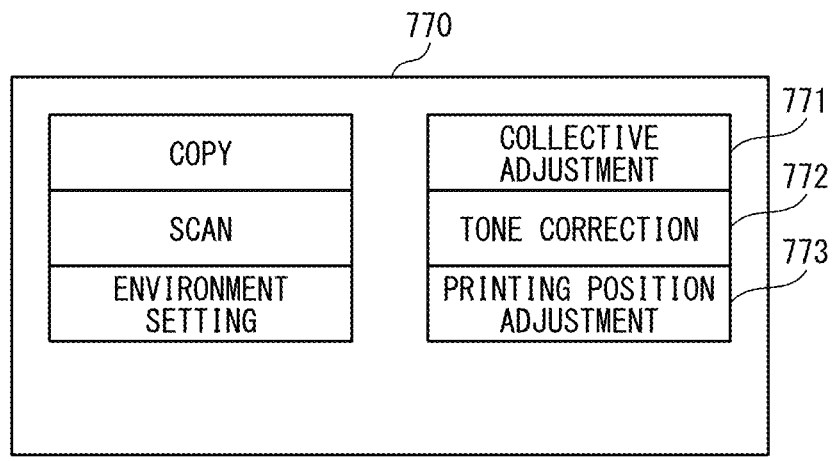
FIG. 15 is an exemplary illustration of an operation screen for setting an operation mode.

FIG. 15 is an exemplary illustration of an operation screen for setting an operation mode of the image forming apparatus 100. This operation screen is denoted by 770 and is displayed on the display of the operating unit 400. The user selects a button displayed on the operation screen 770 through the operating unit 400, to thereby be able to instruct the image forming apparatus 100 to execute processing that is associated with the button.

In a case where a collective adjustment button 771 on the operation screen 770 is selected, what is displayed on the display of the operating unit 400 is switched to an execution reception operation screen for receiving the execution of collecting adjustment. In a case where a tone correction button 772 or a printing position adjustment button 773 on the operation screen 770 is selected, what is displayed on the display of the operating unit 400 is switched to an operation screen for separately executing tone correction or geometric characteristics adjustment by the method described above.

Figure 16:
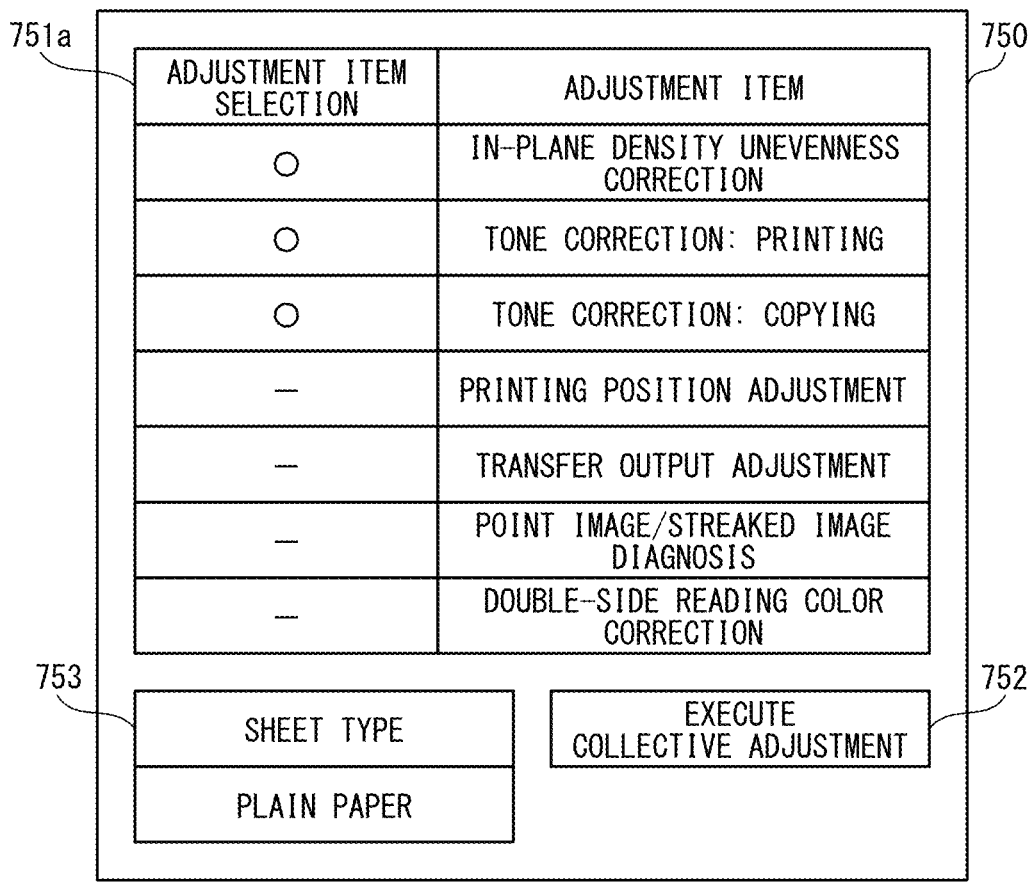
FIG. 16 is an exemplary illustration of an execution reception operation screen.
Figure 17:
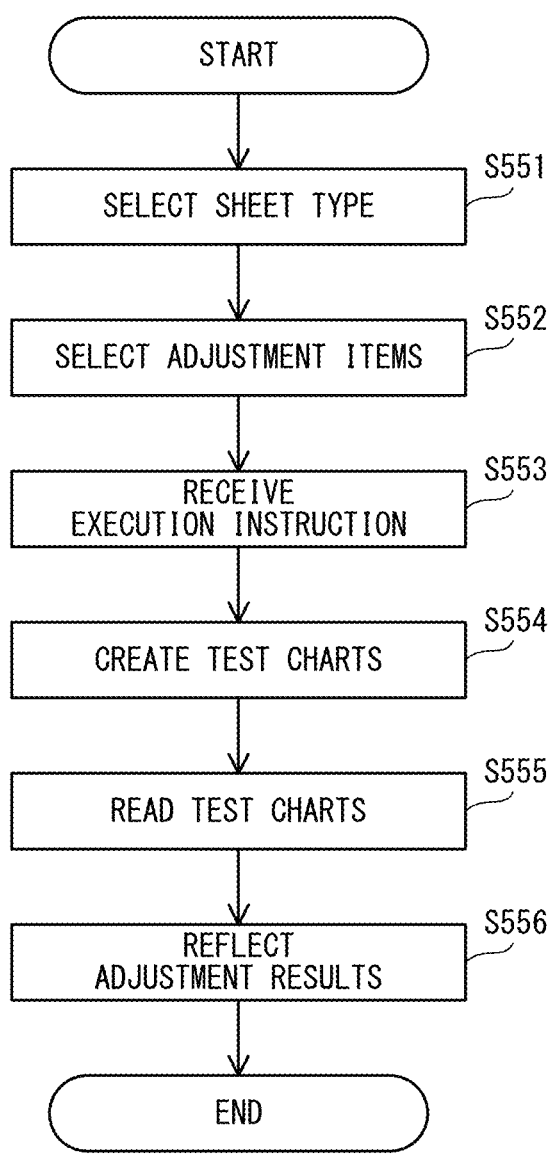
FIG. 17 is a flow chart for illustrating processing of the image forming apparatus in a collective adjustment mode.

FIG. 16 is an exemplary illustration of the execution reception operation screen. An execution reception operation screen 750 includes an adjustment item selection button 751a for selecting, for each adjustment item, whether to execute the adjustment, a collective adjustment execution button 752 for giving an instruction to execute collective adjustment, and a sheet type button 753 for selecting a type of sheet on which adjustment is to be executed. FIG. 17 is a flow chart for illustrating processing of the image forming apparatus 100 in the collective adjustment mode.

In a case where the collective adjustment button 771 is selected on the operation screen 770 of FIG. 15, the CPU 401 displays the execution reception operation screen 750 of FIG. 16 on the display of the operating unit 400. With the selection of the collective adjustment execution button 752, the CPU 401 acquires information about a sheet type selected via the sheet type button 753 at that point (Step S551). This establishes the type of sheet on which adjustment is to be executed in the collective adjustment mode.

In the first embodiment, plain paper is set in advance as a sheet on which adjustment is to be executed. This is because a type of sheet that is used most in the image forming apparatus 100 of the first embodiment is assumed to be plain paper. The sheet type set in advance may be a type of sheet that is found to be used most in printing history of the image forming apparatus 100, or a type of sheet that has been used most in the last one month. In a case where collective adjustment is to be executed for a type of sheet other than the type set in advance, the user can change the preset type to another type of sheet (recycled paper, thin paper, cardboard, coated paper, or the like) by operating the sheet type button 753. That is, in a case where collective adjustment is to be executed for a type set in advance (for example, plain paper), the user can omit the operation of selecting a sheet type. The sheet type button 753 is not displayed in a case where there is no adjustment to be changed depending on the sheet type. Adjustment items to be adjusted at once may be set for each sheet type separately.

After the type of sheet on which adjustment is to be executed in the collective adjustment mode is established, with the selection of the collective adjustment execution button 752 on the execution reception operation screen 750, the CPU 401 acquires information about which adjustment item is selected via the adjustment item selection button 751a at that point (Step S552). This establishes an adjustment item to be adjusted in the collective adjustment mode.

In the example of FIG. 16, three adjustment items, namely, "in-plane density unevenness correction," "tone correction: printing," and "tone correction: copying," are set in advance. The adjustment items set in advance are adjustment items that cause a change in image quality due to a change of an environment condition, for example, the temperature or humidity of a place in which the image forming apparatus 100 is installed, and due to a change with time of parts of the printer 300. For those adjustment items, regular execution of adjustment is required. Those three adjustment items are set in advance in order to reduce the user's operation of selecting an adjustment item in regular maintenance work.

Marks "○" and "-" illustrated in FIG. 16 indicate execution of adjustment and non-execution of adjustment, respectively. The user can use the adjustment item selection button 751a to deselect an adjustment item and thereby cancel the execution of the adjustment item in collective adjustment, and can use the item adjustment selection button 751a to select an adjustment item and thereby add the adjustment item to items to be adjusted in collective adjustment. For a deselected item, "-" is displayed and "○" is displayed for an added item. The user can omit the operation of selecting adjustment items to be adjusted in collective adjustment in a case where the user does not intend to change items to be adjusted in collective adjustment.

After adjustment items are selected, with the selection of the collective adjustment execution button 752 on the execution reception operation screen 750, the CPU 401 receives an instruction to execute collective adjustment (Step S553). When the CPU 401 once receives the execution instruction, the CPU 401 creates test charts by determining test images based on the adjustment items, and printing the test images corresponding to the selected adjustment items in succession on sheets of a selected type (Step S554). In the first embodiment, the test chart 810 for density unevenness correction, the test chart 801a for tone correction in printing, and the test chart 801b for tone correction in copying are created. Test images of the test charts 810, 801a, and 801b are each printed on A4-sized plain paper in a direction that places the longer sides of the A4-sized sheets in the Y-direction (A4 portrait).

The test images may not be printed in a uniform direction, and the test images of the test charts 801a and 801b may be printed in a direction that places the shorter sides of the A4-sized sheets parallel to the Y-direction (A4R) in a case where the test image of the test chart 810 is printed A4 portrait. The test charts may not be created on sheets of a uniform size, and the test chart 811 may be created from an A3-sized sheet and the test charts 801a and 801b may be created from A4-sized sheets. The test charts of the adjustment items may be created in any order. However, the test charts are created from sheets of a selected type in a case where the sheet type button 753 is displayed on the execution reception operation screen 750. That is, in the first embodiment, all sheets used for test charts of the collective adjustment mode are of the same type.

The created test charts 810, 801a, and 801b are all placed on the original tray 302 of the ADF 220. When receiving an instruction to start reading from the operating unit 400, the CPU 401 reads all of the test charts 810, 801a, and 801b in succession by ADF reading (Step S555). The collective adjustment mode is an adjustment mode that reduces workload in adjustment by creating test charts of a plurality of types at once and reading the test charts of the plurality of types in succession, compared to a case in which a plurality of types of adjustment are individually executed. In the collective adjustment mode, the use of the ADF reading eliminates all but one execution of the user's operation for reading test charts for a plurality of types of adjustment.

In the ADF reading, the test charts can be read in succession even when the test charts are stacked on the original tray 302 with sheets of a plurality of sheet sizes being mixed. It is therefore not always required to align the reading directions of the test charts in a case where the test charts are stacked. However, in a case where the test chart 810 is included among test charts created in the collective adjustment mode, the test chart 810 is preferred to be placed on the original tray 302 so that the PX-direction is the SX2-direction as described above. In a case where the test chart 820 for image diagnosis is included among test charts created in the collective adjustment mode, the test chart 820 is preferred to be placed on the original tray 302 so that the chart's longitudinal direction (longer sides) is parallel to the Y-direction.

The CPU 401 executes the processing described above to reflect results of the adjustment of the adjustment items, based on the result of reading the test charts 810, 801a, and 801b (Step S556). This concludes the adjustment processing for more than one adjustment item in the collective adjustment mode.

As described above, the image forming apparatus 100 of the first embodiment enables the user to select items to be adjusted in collective adjustment, and accordingly enables the execution of adjustment only for items that require adjustment. The operation of selecting items by the user can be omitted by setting adjustment items in advance. The operation of selecting a sheet type by the user may also be omitted by setting, in advance, a type of sheet to be used in the creation of test charts.

Second Embodiment

The image forming apparatus 100 of a second embodiment of the present disclosure has the same configuration as the one in the first embodiment. The image forming apparatus 100 of the second embodiment additionally enables, in the collective adjustment mode, selection of maximum density control for adjusting a maximum density of an image to be formed. In a case where the maximum density control is executed, a plurality of test images varied in the intensity of laser light of the exposure device 13 are formed on one sheet. The test images on this sheet are read by ADF reading, and the intensity of laser light that is to be a target maximum density is determined based on the result of the reading.

The maximum density control and tone correction cannot be executed at once. The reason therefor is that a change of laser light intensity in the maximum density control causes density characteristics (γ characteristics) of an image to fluctuate. The density of a test image for tone correction that is formed after the laser light is changed therefore differs from the density of a test image for tone correction that is formed before the laser light is changed. Accordingly, with the LUTa created based on the result of reading a test chart for tone correction that has been created along with a test image for the maximum density control, an image does not have an ideal density.

The image forming apparatus 100 of the second embodiment addresses this by creating each test chart separately even in a case where an instruction to execute collective adjustment is received, in a case in which the maximum density control and tone correction are included among adjustment items acquired in Step S552 by the CPU 401. That is, a test chart in which a test image for the maximum density control is formed is created, and the laser light is adjusted by reading the test chart by the ADF reading. A test chart in which a test image for tone correction is formed is then created and the ADF reading of this test chart is executed.

Accordingly, in a case where the maximum density control and tone correction are selected in the image forming apparatus 100 of the second embodiment, a test chart for tone correction is not printed until the reading of a test chart for the maximum density control is completed, despite the reception of an instruction to execute collective adjustment.

According to the image forming apparatus 100 of the second embodiment, unrequired calibration is not executed and a failure to execute highly precise density correction due to collective creation of test charts can be prevented.

Third Embodiment

The image forming apparatus 100 of a third embodiment of the present disclosure has the same configuration as the one in the first embodiment. In the first embodiment, only items required by the user to be adjusted are adjusted at once by executing only adjustment of items selected by the user from a plurality of types of adjustment items using test charts in the collective adjustment mode.

Figure 18A:
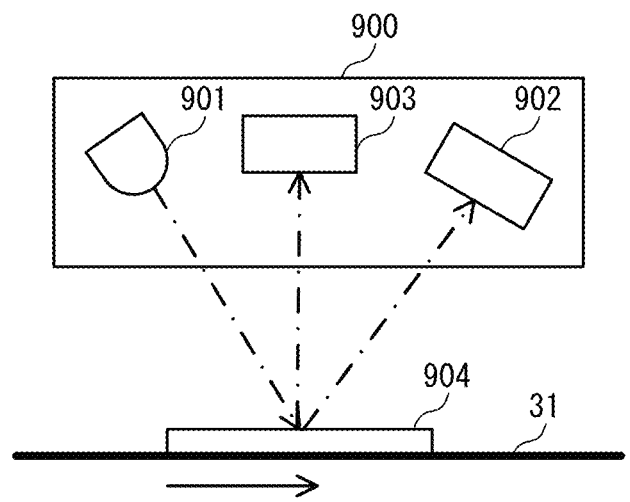
FIG. 18A, FIG. 18B, and FIG. 18C are explanatory diagrams of adjustment processing that does not require a test chart.
Figure 18B:
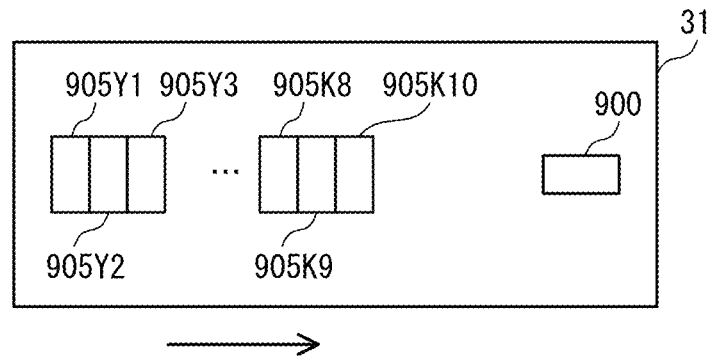
Figure 18C:
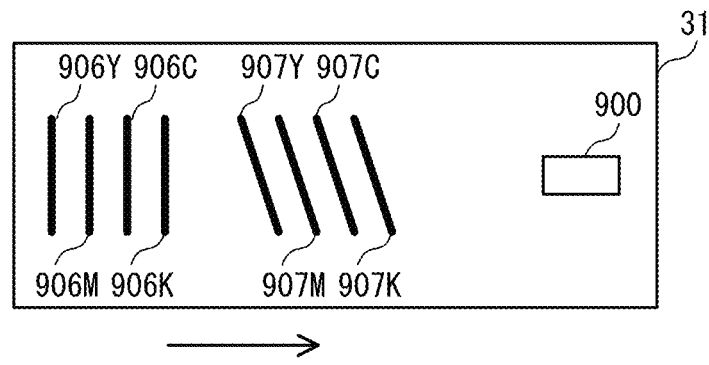

In contrast, the third embodiment deals with a case in which some adjustment in the collective adjustment mode does not require a test chart. Adjustment that does not require a test chart is executed based on the result of detection in which a test image formed on the intermediate transfer belt 31 is detected with a sensor. In the third embodiment, adjustment items that do not require a test chart are added. For example, tone correction and color misregistration adjustment that do not use a test chart are added as adjustment items. FIG. 18A to FIG. 18C are explanatory diagrams of adjustment processing that does not require a test chart.

FIG. 18A is an explanatory diagram of a sensor configured to detect a test image that is formed on the intermediate transfer belt 31. A sensor 900 is an optical sensor and is capable of detecting a test image 904 with the use of specular reflection light and diffuse reflection light. The sensor 900 is configured to detect a test image for tone correction with specular reflection light. The sensor 900 is configured to detect a test image for color misregistration adjustment with diffuse reflection light. The sensor 900 is provided, for example, in the vicinity of the intermediate transfer belt 31, on the downstream side of the plurality of units of the image forming unit 10 in a direction of rotation of the intermediate transfer belt 31.

The sensor 900 includes a light emitter 901 configured to irradiate the test image 904 on the intermediate transfer belt 31, a light receiver 902 configured to receive specular reflection light reflected by the test image 904, and a light receiver 903 configured to receive diffuse reflection light reflected by the test image 904. The light emitter 901 includes a light emitting element, which is a light emitting diode (LED) or the like. The light receivers 902 and 903 each include a light receiving element, which is a photo diode or the like.

The light emitter 901 irradiates with light so that an optical axis is at an angle of 45 degrees with respect to a normal line of the intermediate transfer belt 31. The light receiver 902 is positioned so as to receive light emitted from the light emitter 901 and reflected by the intermediate transfer belt 31 as specular reflection light. The light receiver 902 receives specular reflection light reflected by a surface (base) of the intermediate transfer belt 31 and the test image 904, and outputs an output signal that has a value corresponding to the amount of the received specular reflection light. The density of the test image 904 is detected based on the magnitude of the value of the output signal. The light receiver 903 is positioned so as to receive light emitted from the light emitter 901 and reflected by the intermediate transfer belt 31 as diffuse reflection light. The light receiver 903 receives diffuse reflection light reflected by the surface (base) of the intermediate transfer belt 31 and the test image 904, and outputs an output signal that has a value corresponding to the amount of the received diffuse reflection light. The presence or absence of the test image 904 is determined based on a change in the value of the output signal. The position of the test image is detected from the presence or absence of the test image 904.

Tone Correction

FIG. 18B is an exemplary illustration of a test image for tone correction that does not use a test chart. This test image includes, for each of the colors yellow, magenta, cyan, and black, a plurality of patch images varied in tone. In the third embodiment, patch images in ten tones are formed for each color from density signals indicating ten tones that are set between 10% and 100% at intervals of 10%. The patch images are denoted by 905Y1, 905Y2, 905Y3, . . . , 905K8, 905K9, and 905K10. The density of each of the patch images 905Y1, 905Y2, 905Y3, . . . , 905K8, 905K9, and 905K10 is detected based on the result of receiving specular reflection light at the light receiver 902 of the sensor 900 (the value of the output signal). For example, a table indicating a relationship between the value of the output signal and a density value is prepared, and a density corresponding to the value of the output signal is detected by referring to the table. The tone is corrected by creating and updating the LUTa for correcting tone properties as in the tone correction described above, based on the detected density of each of the patch images 905Y1, 905Y2, 905Y3, . . . , 905K8, 905K9, and 905K10.

Color Misregistration Adjustment

FIG. 18C is an exemplary illustration of a test image for color misregistration adjustment that does not use a test chart. This test image includes patch images 906Y, 906M, 906C, and 906K, which are vertical lines, and patch images 907Y, 907M, 907C, and 907K, which are oblique lines. The patch images 906Y, 906M, 906C, and 906K are straight lines running in the main scanning direction. The patch images 907Y, 907M, 907C, and 907K are straight lines slanted at a predetermined angle (for example, 45°) with respect to the main scanning direction. The patch images 906Y and 907Y are images in yellow. The patch images 906M and 907M are images in magenta. The patch images 906C and 907C are images in cyan. The patch images 906K and 907K are images in black.

The patch images 906Y, 906M, 906C, and 906K are used to measure the amount of correction of color misregistration in the sub-scanning direction. The amount of correction of color misregistration in the main scanning direction is measured by relative distances from the patch images 906Y, 906M, 906C, and 906K to the patch images 907Y, 907M, 907C, and 907K. Color misregistration is corrected by adjusting relative positions of images in the colors of yellow, magenta, cyan, and black, respectively, based on the measured amounts of color misregistration in the sub-scanning direction and the main scanning direction.

FIG. 19A and FIG. 19B are exemplary illustrations of an execution reception operation screen in the third embodiment. In FIG. 19A, an adjustment item that uses the sensor 900 is added to the execution reception operation screen (see FIG. 16) in the first embodiment. A mark "▲ (triangle)" indicating that adjustment is to be executed with the use of the sensor 900 is also added to marks for an adjustment item selection button 751b1, in addition to "○" indicating that adjustment is to be executed, and "-" indicating that adjustment is not to be executed. As illustrated in FIG. 19B, "sheet is used" and "sheet is not used" are displayed side by side, which may be changed so that only one of the two is displayed. In the third embodiment, "tone correction: printing" is adjustment that uses a sheet, and "tone correction: copying" is adjustment that does not use a sheet. "Color misregistration adjustment" is adjustment that does not use a sheet.

Figure 20A:
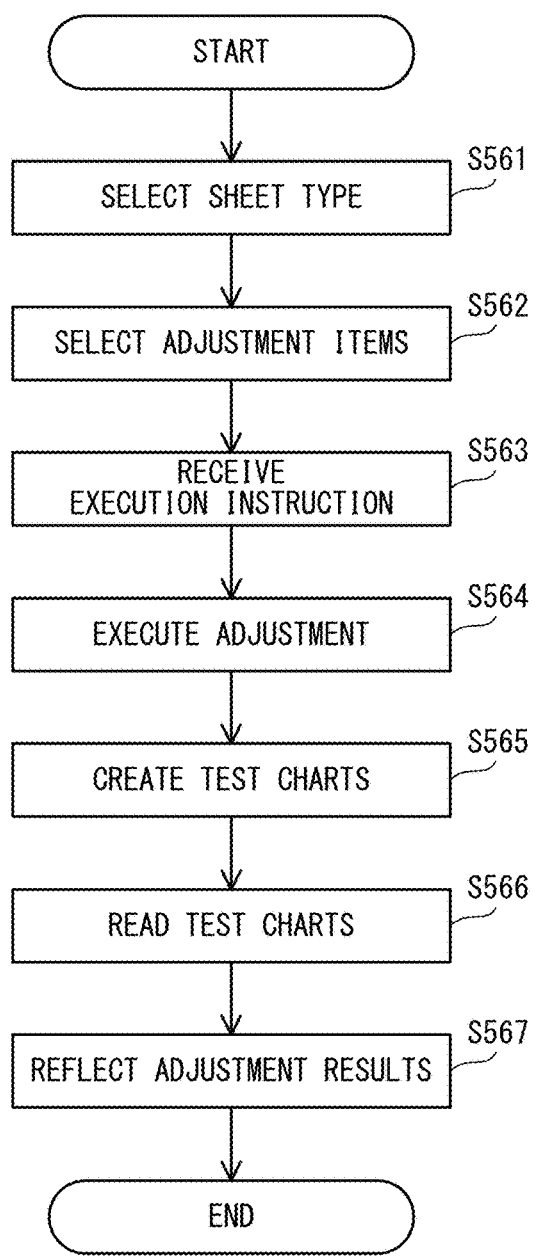
FIG. 20A and FIG. 20B are flow charts for illustrating processing of the image forming apparatus in a collective adjustment mode in the third embodiment.
Figure 20B:
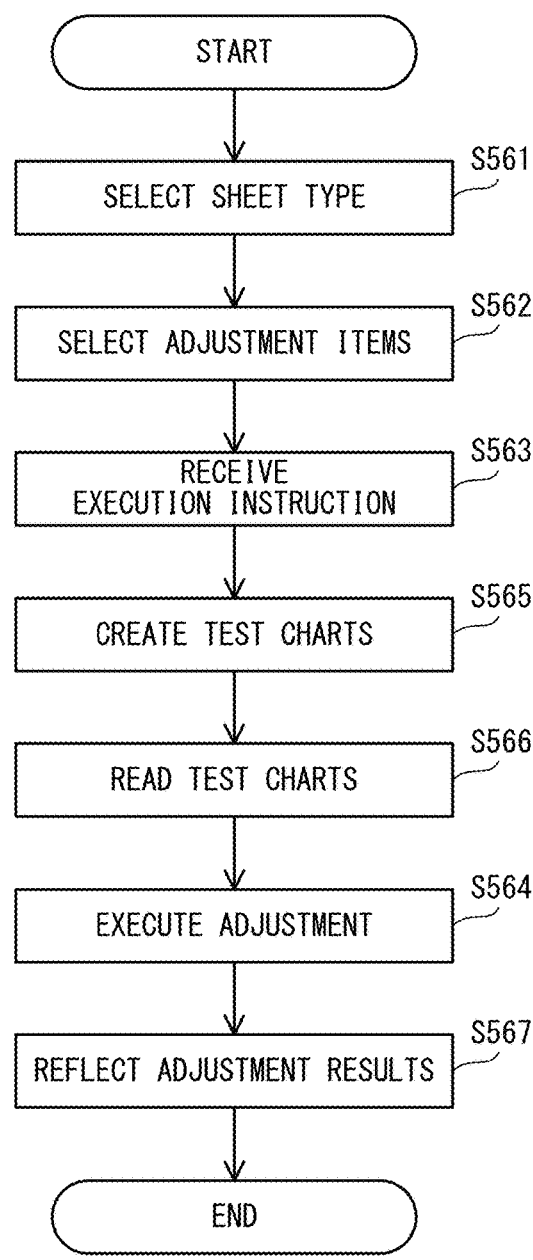

FIG. 20A and FIG. 20B are flow charts for illustrating processing of the image forming apparatus 100 in a collective adjustment mode in the third embodiment. FIG. 20A and FIG. 20B differ from each other only in the order of processing. The processing of selecting a sheet type, the processing of selecting adjustment items, and the processing of receiving an instruction to execute adjustment (Steps S561 to S563) are the same as processing of Step S551, the processing of Step S552, and the processing of Step S553 of FIG. 17, respectively.

In the case of the processing of FIG. 20A, the CPU 401 having received an instruction to execute adjustment executes adjustment that uses the sensor 900 before creating test charts (Step S564). The CPU 401 ensures that the result of the adjustment that uses the sensor 900 described above is reflected. The CPU 401 then creates test charts (Step S565). The execution of adjustment using a test chart after adjustment that uses the sensor 900 is reflected is thus accomplished. For instance, in a case where density unevenness correction is executed after tone correction that uses the sensor 900, density unevenness can be corrected with the use of the test charts 810 and 811 for density unevenness correction at a density suitable for density unevenness correction. The precision of density unevenness adjustment accordingly improves compared to a case in which the tone correction is not executed. The CPU 401 subsequently reads test charts as in Steps S554 to S556 of FIG. 17, and executes, for each read test chart, processing in which the adjustment result is reflected based on the result of the reading (Steps S565 to S567).

In the case of the processing of FIG. 20B, the CPU 401 having received an instruction to execute adjustment creates and reads test charts by the same processing as the one in Steps S554 and S555 of FIG. 17, before adjustment that uses the sensor 900 (Steps S565 and S566). The CPU 401 then executes the adjustment that uses the sensor 900 by the same processing as the one in Step S564 of FIG. 20A (Step S564). Consequently, the last operation performed by the user in the execution of the collective adjustment mode is the operation of inputting an instruction to read test charts by ADF reading. In the processing of FIG. 20B, the user's time taken up by the processing can be shortened by the length of time for which the CPU 401 executes the adjustment that uses the sensor 900, compared to the case of the processing of FIG. 20A. The CPU 401 then executes processing in which the result of the adjustment is reflected based on the result of the reading (Step S567), as in Step S556 of FIG. 17.

In the image forming apparatus 100 of the third embodiment described above, adjustment that requires no test chart is selectable in some of adjustments to be executed in the collective adjustment mode in the first embodiment. The number of sheets of test charts in the collective adjustment mode can accordingly be reduced. In addition, by executing adjustment that uses the sensor 900 after test charts are created, the users time taken up when the adjustment that uses the sensor 900 is included in the collective adjustment mode can be reduced.

Fourth Embodiment

The image forming apparatus 100 of a fourth embodiment of the present disclosure has the same configuration as the one in the first embodiment. In the fourth embodiment, unlike the first embodiment, a combination of adjustment items in the collective adjustment mode that is optimum to the user is presented by changing preselected adjustment items to suit the state of the image forming apparatus 100, with the adjustment item selection button 751a illustrated in FIG. 16. FIG. 21 is an explanatory table of an example of changing adjustment items selected in advance.

Case_A is a combination of adjustment items preferred to be adjusted in the collective adjustment mode in an initial period of installation of the image forming apparatus 100. In this case, it is preferred to execute all adjustments in the collective adjustment mode. The combination of adjustment items of Case_A is therefore selected in advance in the initial installation of the image forming apparatus 100.

Case_B is a combination of adjustment items preferred to be adjusted in the collective adjustment mode in a case where the user performs regular maintenance work. In-plane density unevenness and tone properties are susceptible to the influence of, for example, changes with time from the use of the image forming apparatus 100 and a change of an environment condition, and accordingly require to be adjusted by regular maintenance. The combination of adjustment items of Case_B is therefore selected in advance in maintenance work normally performed by the user. However, with Case_C and Case_D described later, priority is placed on Case_C and then Case_D.

Case_C is a combination of adjustment items to be presented in a case where "tone correction: printing" is an adjustment that has been executed in a fixed length of period prior to the transition of the screen to the execution reception operation screen 750 for the collective adjustment mode. In this case, further adjustment on top of the previous adjustment is unrequired, and items excluding "tone correction: printing" are accordingly selected from the adjustment items shown as items of Case_B. Standards for determining that further adjustment on top of the previous adjustment is unrequired are the time elapsed from the previous adjustment, a change of an environment condition, and a combination of the elapsed time and a change of an environment condition. In the fourth embodiment, an adjustment item adjusted within a week of the previous adjustment is excluded from items selected in advance.

Case_D is a combination of adjustment items to be presented in a case where copying is not found in a job history in a fixed length of period prior to the transition of the screen to the execution reception operation screen 750 for the collective adjustment mode. Some users avoid using the copy function of the image forming apparatus 100 for security reasons. "Tone correction: copying" is not required to be adjusted in the "collective adjustment mode" in this case. In the fourth embodiment, "tone correction: copying"

is excluded from adjustment items selected in advance in a case where copying is not found in the job history in the past three months.

Case_E is a combination of adjustment items preferred to be adjusted in the collective adjustment mode in a case where a new type of sheet is used. This is set because, as described above, the geometric characteristics and the transfer output significantly vary depending on sheet characteristics. In a case where the user selects, with the sheet type button 753 of the execution reception operation screen 750, a new type of sheet for which adjustment has not been made, "geometric characteristics adjustment" and "transfer output adjustment" are added to items selected in advance.

Case_F is a combination of adjustment items preferred to be adjusted in the collective adjustment mode after parts of the image forming apparatus 100 are replaced or maintenance work is performed. "Double-side reading color correction" is set because the correction is an adjustment function of the image forming apparatus 100 as described above. "Point image/streaked image diagnosis" is set because work performed in maintenance may drop specks or the like on the reading position of the reader 200. In a case where parts and a set value that are related to the reader 200 are changed, "point image/streaked image diagnosis" and "double-side reading color correction" are therefore added to items selected in advance.

The method of presenting an optimum combination of adjustment items in the collective adjustment mode to the user is not limited to the one in which preselected adjustment items are changed with the adjustment item selection button 751. FIG. 22 is an exemplary illustration of an execution reception operation screen in the fourth embodiment. This execution reception operation screen 750 displays recommended selection items (adjustment items) as options for an adjustment item selection button 751*d*. The execution reception operation screen 750 may also display a reason 755 for selecting a recommended adjustment item.

In the image forming apparatus 100 of the fourth embodiment described above, adjustment items to be recommended are selected in advance to suit the state of the image forming apparatus 100. This facilitates the user's selection of adjustment items to be adjusted in the collective adjustment mode. This also saves the user's trouble in the operation of changing adjustment items.

Fifth Embodiment

The image forming apparatus 100 of a fifth embodiment of the present disclosure has the same configuration as the one in the first embodiment. FIG. 23 is an exemplary illustration of an execution reception operation screen in the fifth embodiment. In the fifth embodiment, unlike the first embodiment, a plurality of sheet types for which adjustment is to be executed in the collective adjustment mode are selectable for adjustment items indicated by an adjustment item selection button 751*c*.

Differences from the processing in the first embodiment are described. In the fifth embodiment, the CPU 401 can select at once three sheet types, namely, plain paper, cardboard, and recycled paper, as sheet types for which adjustment that is "tone correction: printing" is to be executed, in Step S552 of the processing that is executed by the image forming apparatus 100 in the collective adjustment mode and illustrated in FIG. 17. In the processing of Step S554, the CPU 401 creates test charts at once by printing test images on sheets of a plurality of types. Sheets of different types may be used in Step S554. This is because the ADF 220 can perform the same ADF reading on sheets of different types. In creating the test charts, switch from one sheet type to another sheet type is preferred to be executed after test images to be printed on sheets of one type are printed at once. This is because different image forming conditions or different lookup tables are used for different sheet types, and the time for creating the test charts can be shortened in a case where switch between image forming conditions or between lookup tables is executed less.

In the image forming apparatus 100 of the fifth embodiment described above, sheets of a plurality of types can be adjusted at once in the collective adjustment mode. The burden on the user in the execution of adjustment for sheets of a plurality of types is accordingly lightened.

Sixth Embodiment

An image forming apparatus of a sixth embodiment of the present disclosure uses a print head for the exposure device 13 to form an image. In a case where the exposure device 13 is a print head, unlike the density unevenness correction in the first embodiment, density unevenness correction in the Y-direction is divided into "print head longitudinal unevenness correction" and "density unevenness correction due to factors other than the print head," which are separately executed. The two types of density unevenness correction can each be selected and executed in the collective adjustment mode.

Print Head Longitudinal Unevenness Correction

Print head longitudinal unevenness correction is a function of correcting longitudinal unevenness in the density of the image forming apparatus 100 that is caused by the print head. The following description is about print head longitudinal unevenness correction. Unlike the density unevenness correction in the first embodiment, print head longitudinal unevenness correction is processing of identifying, in advance, the position of a streaked image that is caused by the print head and correcting only the streaked image that is caused by the print head in density unevenness correction.

Print head longitudinal unevenness correction is adjustment unique to the image forming apparatus 100 that has a configuration in which the exposure device 13 is a print head. The print head is an exposure device that includes a light emitting element array, in which LEDs or other light emitting elements are aligned in a single line so as to correspond to pixels, and a rod lens array. The image forming apparatus 100 that uses a print head 130 drives light emitting elements of the print head 130 based on image data, to thereby output light based on the image data from the print head. The light output from the light emitting elements form an image through rod lenses on a surface of relevant one of the photosensitive drums 11. The photosensitive drum 11 is thus exposed to light based on the image data. The exposure position is moved by relatively moving the photosensitive drum 11 and the print head in the sub-scanning direction, and an electrostatic latent image is thus formed on the photosensitive drum 11.

In the image forming apparatus 100 that uses the print head, unevenness in the shape of a streak running in the sub-scanning direction (longitudinal unevenness) may occur. Causes of the longitudinal unevenness are described below.

Figure 24:
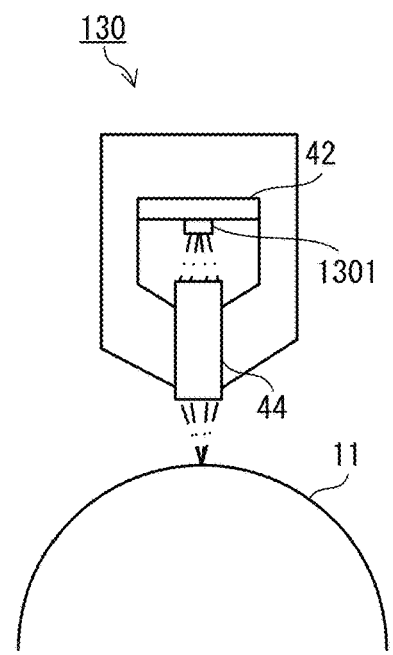
FIG. 24 is an explanatory diagram of a configuration of a print head.

FIG. 24 is an explanatory diagram of a configuration of the print head. The print head 130 includes an LED array 1301, which is a light emitting element array, a printed circuit board 42, and a rod lens array 44, through which light emitted from the LED array 1301 forms an image on the photosensitive drum 11. The printed circuit board 42 supports the LED array 1301, and includes a circuit device for supplying various signals with which the LED array 1301 is driven and controlled. The LED array 1301 is formed of a plurality of LEDs aligned in the Y-direction, and varies in light amount and time-dependent change from one LED to another LED.

Figure 25A:
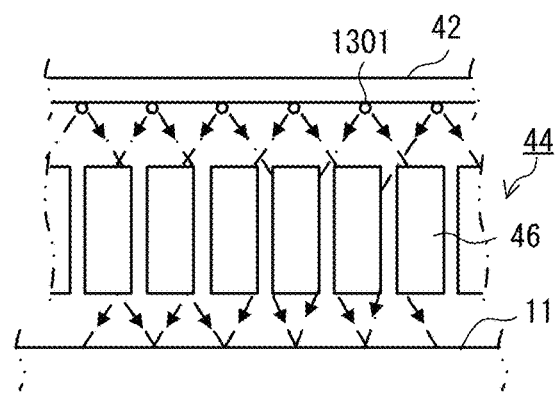
FIG. 25A and FIG. 25B are explanatory diagrams of a rod lens array.
Figure 25B:
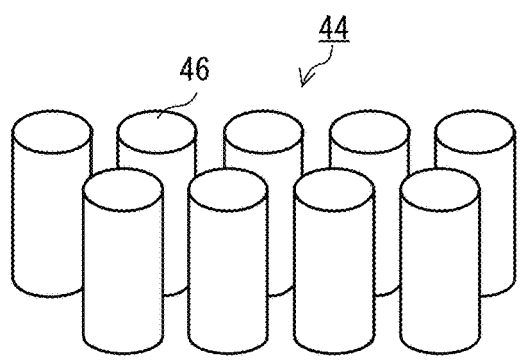

FIG. 25A and FIG. 25B are explanatory diagrams of the rod lens array 44. As illustrated in FIG. 25A, the rod lens array 44 includes a plurality of refractive index distribution-type plastic rod lenses (rod lenses 46), which function as imaging lenses. The refractive index distribution-type plastic rod lenses are, in the sixth embodiment, cylindrical plastic rods that have a refractive index changing in a concentric pattern from the center toward the circumference and that are used as lenses. Through the rod lens array 44, light emitted from the LEDs of the LED array 1301 forms an image on the photosensitive drum 11. The rod lens array 44 causes light incident thereon to form an image, not with the shape of the rod lenses but with the distribution of the refractive index. The rod lenses 46 are, as illustrated in FIG. 25B, are orderly arrayed at predetermined intervals, with optical axis directions thereof aligned.

Figure 26A:
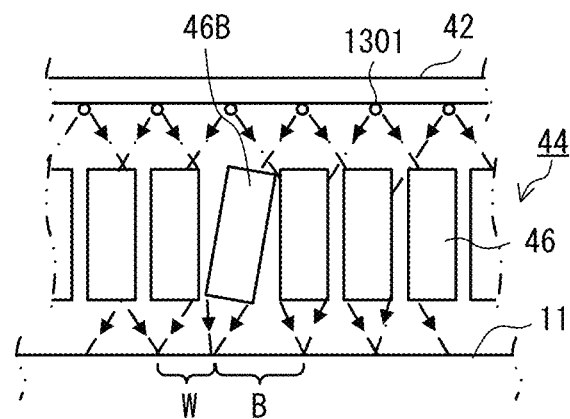
FIG. 26A and FIG. 26B are exemplary illustrations of a state in which one rod lens is accidentally tilted.
Figure 26B:
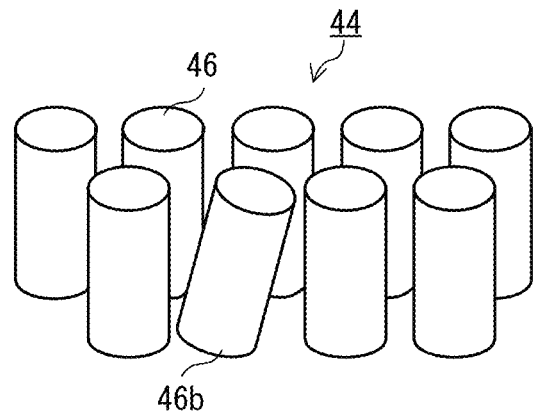

One rod lens or a plurality of rod lenses out of the rod lenses 46 included in the rod lens array 44 sometimes shift from a predetermined position or angle. FIG. 26A and FIG. 26B are exemplary illustrations of a state in which one rod lens 46b is accidentally tilted.

In a case where the rod lens 46b is accidentally tilted and shifts from a predetermined position or angle as illustrated in FIG. 26A and FIG. 26B, the rod lens array 44 may fail to deliver its full optical performance. That is, in a case where the rod lenses 46 are accidentally tilted (fall down) as the rod lens 46b is, light passing through the rod lens 46b does not form an image at an intended position. As a result, light forms an image at a position W of FIG. 26A, and increases dots to a density denser than a designed dot density, which causes a faint streak image, whereas dots at a position B of FIG. 26A decrease to a density scarcer than the designed dot density, which causes a dark streak image. Longitudinal unevenness is thus caused right under the rod lens 46b, which has accidentally been tilted, and in a nearby area. In a case where the rod lenses 46 are not physically shifted from a predetermined position or angle but fluctuate in internal refractive index distribution to a degree that deviates from a desired value, the rod lenses 46 optically fail to satisfy specification performance, and longitudinal unevenness occurs as in the case described above.

In short, unevenness caused by the rod lens array 44 is correctable by measuring characteristics in advance, for example, at the time of shipment from a factory, to thereby identify a position inclined to longitudinal unevenness, and correcting only longitudinal unevenness that has occurred at the identified position. In this manner, longitudinal unevenness is corrected separately from density unevenness that is caused by factors other than the rod lens array 44.

Meanwhile, the LED array 1301 fluctuates in light amount and time-dependent change from LED to LED as described above. The fluctuations in light amount and time-dependent change from LED to LED are one of the causes of longitudinal unevenness. It is therefore required to execute adjustment on an LED-by-LED basis.

Figure 27:
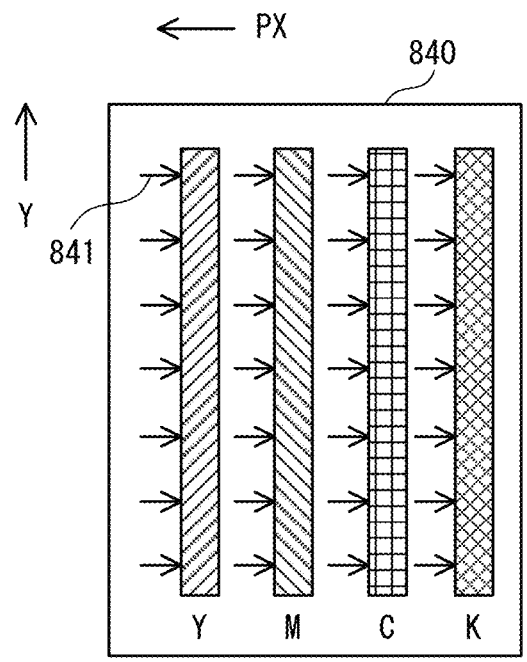
FIG. 27 is an exemplary illustration of a test chart for print head longitudinal unevenness correction.

FIG. 27 is an exemplary illustration of a test chart 840 for print head longitudinal unevenness correction. A test image of the test chart 840 for print head longitudinal unevenness correction includes band-shaped patch images in the colors of yellow (Y), magenta (M), cyan (C), and black (K), respectively, and images of arrows 841. The density signal indicates 50% for the band-shaped patch image of each color. The arrows 841 are formed in order to associate a position of the print head 130 in the Y-direction with a position of the test chart 840 in the Y-direction. The positions of the LEDs of the LED array 1301 are associated by the arrows 841.

Print head longitudinal unevenness correction is executed based on the result of reading the test chart 840 for print head longitudinal unevenness correction. Correction of only longitudinal unevenness caused by the rod lens array 44 is accomplished by performing feedback correction on the light emission amount of the print head 130 only at a position in the Y-direction that is set as a correction target in advance from the result of reading the test chart 840 for print head longitudinal unevenness correction. The LED array 1301 is corrected for fluctuations in light amount and time-dependent change on an LED-by-LED basis by performing feedback correction on the light emission amount of the print head 130 for each LED included in the LED array 1301 at a time. The test chart 840 is read by the ADF reading (the first reading mode) or the original table reading (the second reading mode) with the reader 200 as in tone correction.

Correction of Density Unevenness Due to Factors Other than Print Head

Figure 28:
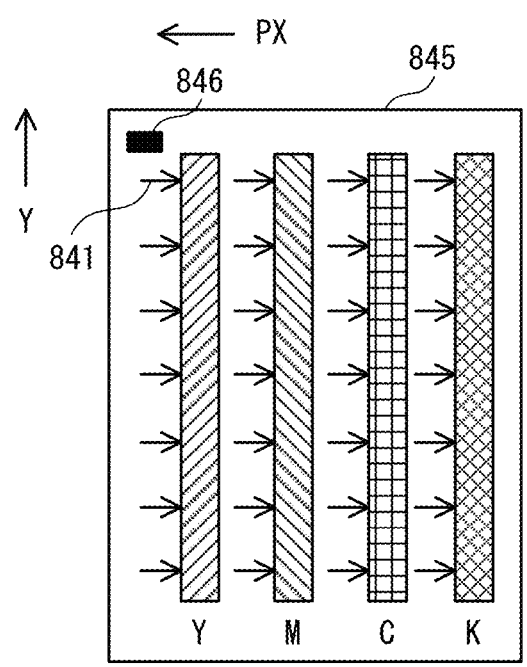
FIG. 28 is an exemplary illustration of a test chart for correction of density unevenness that is caused by a factor other than the print head.

FIG. 28 is an exemplary illustration of a test chart 845 for correction of density unevenness due to factors other than the print head 130. The test chart 845 differs from the test chart 840, which is exemplarily illustrated in FIG. 27, in that a mark 846 for discriminating the test chart is added.

In correction of density unevenness due to factors other than the print head 130, density unevenness in the Y-direction that is caused by a factor other than the print head 130 is corrected by feedback that changes a signal value of image data at each position in the Y-direction. That is, in a case where an image is formed, signal values of image data in the Y-direction that may be set to the same value are corrected prior to image forming so as to reflect the result of the correction of density unevenness due to factors other than the print head 130.

In the sixth embodiment, unlike the first embodiment, "in-plane (density) unevenness correction" as one of adjustments in the collective adjustment mode is divided into "print head longitudinal unevenness correction" and "correction of density unevenness due to factors other than the print head," which are separately executed.

The "in-plane (density) unevenness correction" in the first embodiment is correction of density unevenness in the Y-direction that is caused by the image forming unit 10 including the exposure device 13. In contrast, with "print head longitudinal unevenness correction" in the sixth embodiment, correction of only density unevenness in the Y-direction that is caused by the print head 130 is accomplished. In "correction of density unevenness due to factors other than the print head," density unevenness in the Y-direction that is caused by the image forming unit 10, which is a component other than the print head 130, can be corrected.

As described above in the first to sixth embodiments, the image forming apparatus 100 can execute a plurality of adjustments at once in the collective adjustment mode by selecting suitable adjustment items and operating in the collective adjustment mode. That is, execution of unrequired adjustment can be prevented to suit the state of the image forming apparatus 100 and the user's purpose even in an operation mode in which a plurality of types of adjustment are executed at once, by selecting types of adjustment to be executed. Execution of only adjustment required by the user that maintains usability is thus accomplished.

Other Embodiments

In the image forming apparatus 100 of the first to sixth embodiments, the CPU 401 causes the image forming apparatus 100 to create test charts. An alternative configuration may be employed in which, for example, an information processing apparatus configured to communicate with the image forming apparatus 100 instructs the image forming apparatus 100 to create test charts in succession. In a case where a collective adjustment mode is instructed to be executed in this configuration, a CPU of the information processing apparatus determines a plurality of test charts based on adjustment items, and instructs the image forming apparatus 100 to create the plurality of test charts. The image forming apparatus 100 reads the plurality of test charts by the ADF reading, and controls adjustment factors based on the result of the reading.

According to this configuration, execution of only adjustment of items required to be adjusted is possible.

Embodiment(s) of the present disclosure can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-223473, filed Dec. 11, 2019, which is hereby incorporated by reference herein in its entirety.

What is claimed is:
1. An information processing apparatus that communicates with an image forming apparatus, the information processing apparatus comprising:
an operating unit configured to acquire a command to perform calibration for the image forming apparatus; and
a controller configured to:
control a display to display a screen for selecting a calibration setting in which a first calibration in which a first type of sheet is used and a second calibration in which a second type of sheet is used are performed together, wherein the first type of sheet is different from the second type of sheet;
receive the calibration setting;
control, in a case where the command is acquired by the operating unit, the image forming apparatus based on the calibration setting to form a first test chart for the first calibration on a first sheet of which the first type and to form a second test chart for the second calibration on a second sheet of which the second type;
control the image forming apparatus to perform the first calibration and the second calibration based on reading data related to the first test chart and the second test chart, the reading data outputting by a reading device.

2. The information processing apparatus according to claim 1,
wherein the first calibration and the second calibration are selected from calibrations, and
wherein the calibrations include a calibration for adjusting tone characteristics of an image to be formed, a calibration for adjusting density unevenness of an image to be formed, and a calibration for adjusting geometric characteristics of an image to be formed.

3. The information processing apparatus according to claim 1,
wherein the first calibration and the second calibration are selected from calibrations,
wherein the calibrations include first tone correction for correcting tone characteristics of an image to be formed based on image data, for which halftone processing of a first type is executed, and second tone correction for adjusting tone characteristics of an image to be formed based on image data, for which halftone processing of a second type is executed, and
wherein the halftone processing of the first type differs from the halftone processing of the second type.

4. The information processing apparatus according to claim 1,
wherein the calibrations include maximum density adjustment for adjusting a maximum density of an image to be formed, and tone correction for correcting tone characteristics of an image to be formed, and
wherein the controller is configured to wait, in a case where both of the maximum density adjustment and the tone correction are selected as the first calibration, formation of the first test chart for the tone correction until reading of the first test chart for the maximum density adjustment is completed.

5. The information processing apparatus according to claim 1, further comprising a notification unit configured to notify recommend calibrations to be performed as the first calibration and the second calibration from among calibrations.

6. An image forming apparatus comprising:
a reader configured to convey a sheet, and read image of the sheet during conveying the sheet;
an image forming unit configured to form an image;

an operating unit configured to acquire a command to perform calibration; and a controller configured to:
- control a display to display a screen for selecting a calibration setting in which a first calibration in which a first type of sheet is used and a second calibration in which a second type of sheet is used are performed together, wherein the first type of sheet is different from the second type of sheet;
- receive the calibration setting;
- control, in a case where the command is acquired by the operating unit, the image forming unit based on the calibration setting to form a first test chart for the first calibration on a first sheet of which the first type and to form a second test chart for the second calibration on a second sheet of which the second type;
- control the reader to read the first test chart and the second test chart; and
- perform the first calibration and the second calibration based on reading results of the first test chart and the second test chart.

7. The image forming apparatus according to claim 6, wherein the first calibration and the second calibration are selected from calibrations,
wherein the calibrations include a calibration for adjusting tone characteristics of an image to be formed, a calibration for adjusting density unevenness of an image to be formed, and a calibration for adjusting geometric characteristics of an image to be formed.

8. The image forming apparatus according to claim 6, wherein the first calibration and the second calibration are selected from calibrations,
wherein the calibrations include first tone correction for correcting tone characteristics of an image to be formed based on image data, for which halftone processing of a first type is executed, and second tone correction for adjusting tone characteristics of an image to be formed based on image data, for which halftone processing of a second type is executed, and
wherein the halftone processing of the first type differs from the halftone processing of the second type.

9. The image forming apparatus according to claim 6, wherein the controller is configured to execute halftone processing on image data, and convert the image data based on a conversion condition that corresponds to a type of the halftone processing,
wherein the calibrations include a calibration for generating a first conversion condition, which corresponds to halftone processing of a first type, and a calibration for generating a second conversion condition, which corresponds to halftone processing of a second type, and
wherein the image forming unit is configured to form the image on the sheet based on the converted image data.

10. The image forming apparatus according to claim 6, wherein the calibrations include maximum density adjustment for adjusting a maximum density of an image to be formed, and tone correction for correcting tone characteristics of an image to be formed, and
wherein the controller is configured to wait, in a case where both of the maximum density adjustment and the tone correction are selected as the first calibration, formation of the first test chart for the tone correction until reading of the first test chart for the maximum density adjustment is completed.

11. The image forming apparatus according to claim 6, wherein the controller is configured to convert image data based on a conversion condition,
wherein the image forming unit is controlled based on an image forming condition, and is configured to form the image based on the converted image data, and
wherein the calibrations include a calibration for determining the image forming condition, and a calibration for generating the conversion condition.

12. The image forming apparatus according to claim 6, further comprising a notification unit configured to notify recommend calibrations to be performed as the first calibration and the second calibration from among the calibrations.

13. The image forming apparatus according to claim 6, wherein the reader has a document feeder to convey an original, and
wherein the image forming unit forms an image based on a reading result of the original by the reader.

* * * * *